US011636200B2

(12) United States Patent
Daniel et al.

(10) Patent No.: US 11,636,200 B2
(45) Date of Patent: Apr. 25, 2023

(54) SYSTEM AND METHOD FOR REMOTELY DETECTING AN ANOMALY

(71) Applicant: Palo Alto Research Center Incorporated, Palo Alto, CA (US)

(72) Inventors: George Daniel, Mountain View, CA (US); Alexander Feldman, Santa Cruz, CA (US); Bhaskar Saha, Redwood City, CA (US); Anurag Ganguli, Milpitas, CA (US); Bernard D. Casse, Saratoga, CA (US); Johan de Kleer, Los Altos, CA (US); Shantanu Rane, Mountain View, CA (US); Ion Matei, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 887 days.

(21) Appl. No.: 16/004,571

(22) Filed: Jun. 11, 2018

(65) Prior Publication Data
US 2019/0377870 A1 Dec. 12, 2019

(51) Int. Cl.
*G06F 21/55* (2013.01)
*G06N 20/00* (2019.01)

(52) U.S. Cl.
CPC .......... *G06F 21/552* (2013.01); *G06F 21/554* (2013.01); *G06N 20/00* (2019.01); *G06F 2221/034* (2013.01)

(58) Field of Classification Search
CPC .................................................... G06F 21/552
USPC ........................................................ 726/23
See application file for complete search history.

(56) References Cited

U.S. PATENT DOCUMENTS

2007/0250930 A1* 10/2007 Aziz ..................... G06F 21/554 726/24
2016/0342791 A1* 11/2016 Aguayo Gonzalez . G01R 21/00

FOREIGN PATENT DOCUMENTS

| WO | WO 2014/144857 A2 | 9/2014 |
| WO | WO 2014/144857 A3 | 9/2014 |
| WO | WO 2018/052446 A1 | 3/2018 |

OTHER PUBLICATIONS

"Electromagnetic Metamaterials: A New Paradigm of Antenna Design," IEEE Access, vol. 9, pp. 18722-18751 (Jan. 22, 2021).*
Callan, Robert, Alenka Zajić, and Milos Prvulovic. "FASE: finding amplitude-modulated side-channel emanations." Proceedings of the 42nd Annual International Symposium on Computer Architecture. ACM, 2015.
I. Matei, A. Ganguli, T. Honda, and J. de Kleer. The case for a hybrid approach to diagnosis: A railway switch. In International Workshop on Principles of Diagnosis, 2015.
(Continued)

*Primary Examiner* — Jacob Lipman
(74) *Attorney, Agent, or Firm* — Lippes Mathias LLP

(57) ABSTRACT

The following relates generally to defense mechanisms and security systems. Broadly, systems and methods are disclosed that detect an anomaly in an Embedded Mission Specific Device (EMSD). Disclosed approaches include a meta-material antenna configured to receive a radio frequency signal from the EMSD, and a central reader configured to receive a signal from the meta-material antenna. The central reader may be configured to: build a finite state machine model of the EMSD based on the signal received from the meta-material antenna; and detect if an anomaly exists in the EMSD based on the built finite state machine model.

20 Claims, 14 Drawing Sheets

(56) References Cited

OTHER PUBLICATIONS

Lukas Kuhn, Bob Price, Johan de Kleer, Minh Do, and Rong Zhou. Pervasive diagnosis: Integration of active diagnosis into production plans. In AAAI, 2008.
De Kleer, Johan, and Brian C. Williams. "Diagnosing multiple faults." Artificial intelligence 32.1 (1987): 97-130.
B. Saha, T. Honda, I. Matei, E. Saund, J. de Kleer, T. Kurtoglu, and Z. Lattmann, "A Model-Based Approach for an Optimal Maintenance Strategy", 2nd European Prognostics and Health Management Conference, 2014.
Li, Jingyuan, Tejaswi Tamminedi, Guy Yosiphon, Anurag Ganguli, Lei Zhang, John A. Stankovic, and Jacob Yadegar. "Remote physiological monitoring of first responders with intermittent network connectivity." In Wireless Health 2010, pp. 64-73. ACM, 2010.
Eldardiry, Hoda, et al. "Multi-source fusion for anomaly detection: using across-domain and across-time peer-group consistency checks." Journal of Wireless Mobile Networks, Ubiquitous Computing, and Dependable Applications (JoWUA) 5.2 (2014): 39-58.
"Continuing the march: The past, present, and future of the IoT in the military" http://dupress.com/articles/internet-of-things-iot-in-military-defense-industry/. Accessed on Nov. 12, 2015.
Eisenbarth, Thomas, Christof Paar, and Björn Weghenkel. "Building a side channel based disassembler." Transactions on computational science X. Springer Berlin Heidelberg, 2010. 78-99.
Rethinagiri, Santhosh Kumar, et al. "System-level power estimation tool for embedded processor based platforms." Proceedings of the 6th Workshop on Rapid Simulation and Performance Evaluation: Methods and Tools. ACM, 2014.
Kraz, Vladimir. "Near-field methods of locating emi sources." RF Expo West. 1995.
S. A. Hofmeyr, S. Forrest, A. Somayaji, Intrusion Detection using Sequences of System Calls, Journal of Computer Security vol. 6 (1998) p. 151-180.
I. Krka, Y. Brun, and N. Medvidovic, "Automatic mining of specifications from invocation traces and method invariants," in Proceedings of the 22nd ACM SIGSOFT International Symposium on Foundations of Software Engineering, (FSE-22), Hong Kong, China, Nov. 16-22, 2014, 2014, pp. 178-189.
M. Acharya, T. Xie, J. Pei, and J. Xu. Mining API Patterns as Partial Orders from Source Code: From Usage Scenarios to Specifications. In proceedings of the 6th joint meeting of the European Software Engineering Conference and the ACM SIGSOFT International Symposium on Foundations of Software Engineering, 2007.
G. Ammons, R. Bodik, and J. R. Larus. Mining Specification. In proceedings of the 35th Annual ACM SIGPLAN-SIGACT Symposium on Principles of Programming Languages, 2002.
M. Ernst, J. Cockrell, W. Griswold, and D. Notkin. Dynamically discovering likely program invariants to support program evolution. IEEE Transaction on Software Engineering, 27(2):99-123, Feb. 2001.
D. Lo, S.-C. Khoo, and C. Liu. Mining temporal rules for software maintenance. Journal of Software Maintenance and Evolution: Research and Practice, 20(4):227-247, 2008.
Le, Tien-Duy B., et al. "Synergizing Specification Miners through Model Fissions and Fusions." In Proceedings of International Conference on Automated Software Engineering, 2015.
Ashish Gehani and Dawood Tariq, SPADE: Support for Provenance Auditing in Distributed Environments, 13th ACM/IFIP/USENIX International Conference on Middleware, 2012.
Godefroid, Patrice. "Random testing for security: blackbox vs. whitebox fuzzing." Proceedings of the 2nd international workshop on Random testing: co-located with the 22nd IEEE/ACM International Conference on Automated Software Engineering (ASE 2007). ACM, 2007.
Farzan, Azadeh, Andreas Holzer, and Helmut Veith. "Perspectives on White-Box Testing: Coverage, Concurrency, and Concolic Execution." Software Testing, Verification and Validation (ICST), 2015 IEEE 8th International Conference on. IEEE, 2015.
Gonzalez-Sanchez, A., Abreu, R., Gross, H. G., & van Gemund, A. J. (Aug. 2011). Spectrum-Based Sequential Diagnosis. In AAAI.
Campos, J., Abreu, R., Fraser, G., & d'Amorim, M. (Nov. 2013). Entropy-based test generation for improved fault localization. In Automated Software Engineering (ASE), 2013 IEEE/ACM 28th International Conference on (pp. 257-267). IEEE.
Standaert, François-Xavier, and Cédric Archambeau. "Using subspace-based template attacks to compare and combine power and electromagnetic information leakages." Cryptographic Hardware and Embedded Systems—CHES 2008. Springer Berlin Heidelberg, 2008. 411-425.
Demme, John, and Simha Sethumadhavan. "Side-Channel Vulnerability Metrics: SVF vs. CSV." (2014).
Horn, Roger A., and Charles R. Johnson. Matrix analysis. Cambridge university press, 2012.
Laurent, Johann, et al. "Functional level power analysis: An efficient approach for modeling the power consumption of complex processors." Proceedings of the conference on Design, automation and test in Europe—vol. 1. IEEE Computer Society, 2004.
Ennulat RD. The Selective Light reflection by Plane textures. Molecular Crystals and Liquid Crystals. 1971;13:337-55.
LCRHallcrest Handbook of Thermochromic Liquid Crystal Technology, available at http://www.hallcrest.com, 2014.
Parsley, M. "The use of thermochromic liquid crystals in research applications, thermal mapping and non-destructive testing." Semiconductor Thermal Measurement and Management Symposium, 1991. Semi-Therm VII. Proceedings., Seventh Annual IEEE. IEEE, 1991.
Dabiri, D. Digital particle image thermometry/velocimetry: a review, Exp. Fluids (2009) 46:191-241.
Xie, Jierui, and Mandis S. Beigi. "A scale-invariant local descriptor for event recognition in 1d sensor signals." Multimedia and Expo, 2009. ICME 2009. IEEE International Conference on. IEEE, 2009.
Ye, Lexiang, and Eamonn Keogh. "Time series shapelets: a new primitive for data mining." Proceedings of the 15th ACM SIGKDD international conference on Knowledge discovery and data mining. ACM, 2009.
Hills, Jon, et al. "Classification of time series by shapelet transformation." Data Mining and Knowledge Discovery 28.4 (2014): 851-881.
Donoho, D.L., and Michael Elad. "Optimally sparse representation in general (nonorthogonal) dictionaries via L1 minimization." Proceedings of the National Academy of Sciences, 100.5 (2003): 2197-2202.
Fuchs, J. "On sparse representations in arbitrary redundant bases." IEEE Transactions on Information Theory, 50.6 (2004): 1341-1344.
Tropp, J. "Greed is good: Algorithmic results for sparse approximation." IEEE Transactions on Information Theory, 50.10 (2004): 2231-2242.
Duarte, M.F., et al. "Distributed compressed sensing of jointly sparse signals." Asilomar Conf. Signals, Sys., Comput. 2005.
Rabiner, Lawrence R., and Biing-Hwang Juang. "An introduction to hidden Markov models." ASSP Magazine, IEEE 3.1 (1986): 4-16.
Park, Sung Cheol, Min Kyu Park, and Moon Gi Kang. "Super-resolution image reconstruction: a technical overview." Signal Processing Magazine, IEEE 20.3 (2003): 21-36.
Communication dated Oct. 14, 2019 in related EP Application No. 19179156.5.
Glass-Vanderlan, Tarrah R. et al., "A Survey of Intrusion Detection Systems Leveraging Host Data", arXiv:1805.06070v2 [cs.CR] May 17, 2018, 40 pp XP080878725.

* cited by examiner

SYSTEM AND METHOD FOR REMOTELY DETECTING AN ANOMALY

BACKGROUND

The present application relates generally to defense mechanisms and security systems. Currently, system administrators employ various defense mechanisms such as anti-virus programs, time and performance analysis, and sound to detect intrusions.

BRIEF DESCRIPTION

Advantageously, embodiments described herein dramatically increase the security of monitored systems. Embodiments can be deployed in highly-sensitive environments such as nuclear power plants, and military installations. A distinct advantage of the systems and methods described herein is that they are totally non-intrusive. Previously known approaches had required installation of hardware/software; in contrast, systems and methods described herein analyze the electromagnetic signal(s) and temperature.

In accordance with one aspect of the present application, a system for detecting an anomaly in an Embedded Mission Specific Device (EMSD) is provided. The system may include a meta-material antenna configured to receive a radio frequency signal from the EMSD, and a central reader configured to receive a signal from the meta-material antenna. The central reader may further be configured to: build a finite state machine model of the EMSD based on the signal received from the meta-material antenna; and detect if an anomaly exists in the EMSD based on the built finite state machine model.

In the system as described in the preceding paragraph, the finite state machine model of the EMSD may be built using machine learning to analyze the signal received from the meta-material antenna. The central reader may be further configured to build the finite state machine model of the EMSD based on a temperature distribution and dynamics of the EMSD. The finite state machine model of the EMSD may be built using machine learning to analyze the temperature distribution. The central reader may be further configured to build the finite state machine model of the EMSD based on a power trace of the EMSD. The finite state machine model of the EMSD may be built using machine learning to analyze the power trace.

In the system as described in any of the preceding paragraphs, the central reader may be further configured to build the finite state machine model by: forming a plurality of clusters of execution traces from a set of execution traces; and computing a separate finite state automation (FSA) for each cluster within the plurality of clusters. The meta-material antenna length and width may be both less than $\lambda/40$; where $\lambda$ is a wavelength of operation of the meta-material antenna which is in the megahertz (MHz) range. The meta-material antenna may comprise a sticker configured to be placed on the EMSD. The central reader may be further configured identify a particular attack based on: a library of attack vectors and their corresponding instruction sequences; and the finite state machine model. The central reader may be further configured to: in response to detection of an anomaly in the EMSD, shut down the EMSD. The built finite state machine model may be a normal model, and the central reader may be further configured to detect if an anomaly exists in the EMSD based on a ratio between a likelihood of the normal model and a likelihood of an abnormal finite state machine model of the EMSD.

In another aspect, a method for detecting an anomaly in an EMSD is provided. The method may include receiving, with a meta-material antenna, a radio frequency signal from the EMSD. The method may further include, with a central reader: receiving a signal from the meta-material antenna; building a finite state machine model of the EMSD based on the signal received from the meta-material antenna; and detecting that an anomaly exists in the EMSD based on the built finite state machine model.

In another aspect, a system for detecting an anomaly in an EMSD is provided. The system may include a meta-material antenna configured to receive a radio frequency signal from the EMSD, and one or more processors configured to receive a signal from the meta-material antenna. The one or more processors may further be configured to: build a finite state machine model of the EMSD based on the signal received from the meta-material antenna; and detect if an anomaly exists in the EMSD based on the built finite state machine model. The one or more processors may be comprised in a thin client, smart phone, or laptop.

In some embodiments, a different level of analysis can be employed for detecting root-cause-of-failure. In some implementations, the device can be used for not only detecting intrusions, but also for doing diagnostics of physical devices.

One aspect resides in building a non-intrusive hardware device for virus detection.

Another aspect resides in combining electromagnetic emissions and infrared data for detecting the state of an embedded device.

Another aspect resides in using machine learning for determining the state of micro-processor and if the embedded device is infected.

Another aspect resides in an improved antenna design, and an improved antenna/device transmission.

Another aspect resides in improved feature extraction mechanisms, and in an improved analysis algorithm.

Another aspect resides in the use of machine learning for determining the state of a CPU and for building models.

Another aspect resides in the use of electromagnetic emissions for detecting viruses and intrusions of hardware systems.

Another aspect resides in the use of infrared images for detecting viruses and intrusions of hardware systems.

Another aspect resides in the fusion of infrared and electromagnetic for intrusion detection.

Another aspect resides in the use of the disclosed types of antennas for specific frequencies.

DETAILED DESCRIPTION

Systems and methods described herein analyze the electromagnetic spectrum, the infra-red emissions, and other modalities (e.g., sound and video) to track intrusions, viruses, and illegal or suspicious modifications of microcontrollers, mobile phones, laptops, desktops, servers, and other computers. In some implementations, this is a hardware device, not connected to the Internet, and thus an attacker cannot neutralize it remotely. Advantageously, this solves the problem of attackers disabling the defenses of the users (such as firewalls, anti-virus programs, and others).

Figure 1A:
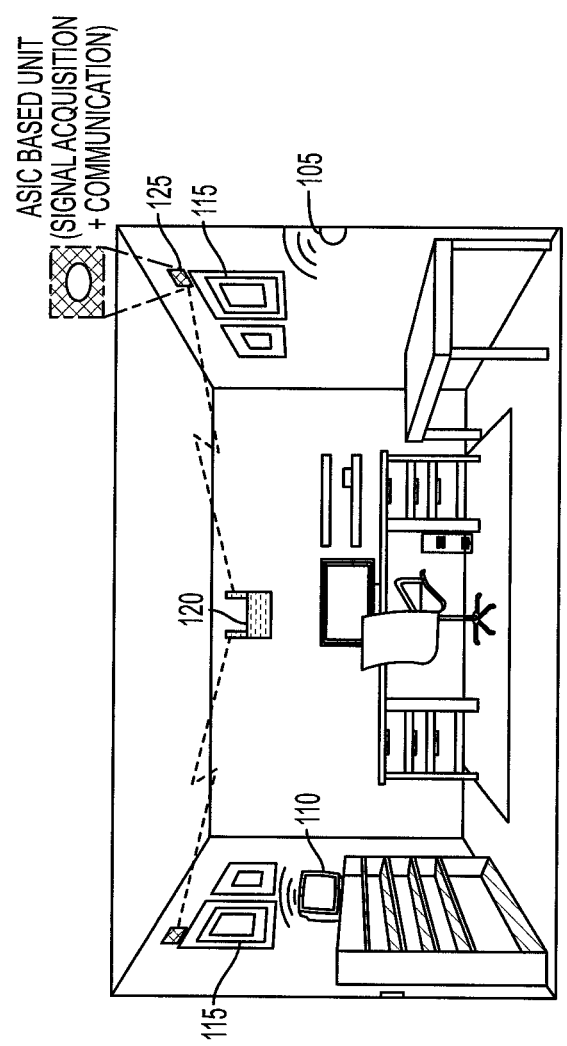
FIG. 1A illustrates an embodiment.

Some embodiments use Analog Logic Analysis using Responsive Materials (ALARM) system, which is a breakthrough analog logic analyzer that combines innovative high-fidelity responsive material-based sensing technologies, and a hybrid model-based and data-analytics approach for malware detection. FIG. 1A illustrates an embodiment including an ALARM system for monitoring Embedded Mission Specific Devices (EMSDs). Specifically, FIG. 1A shows a first monitored device 105, a second monitored device 110, and ultra-thin, small size customized near-field antennas 115 for local sensing. FIG. 1A further shows central reader 120 which may monitor multiple devices, and ASIC based unit 125 for signal acquisition and communication.

Figure 1B:
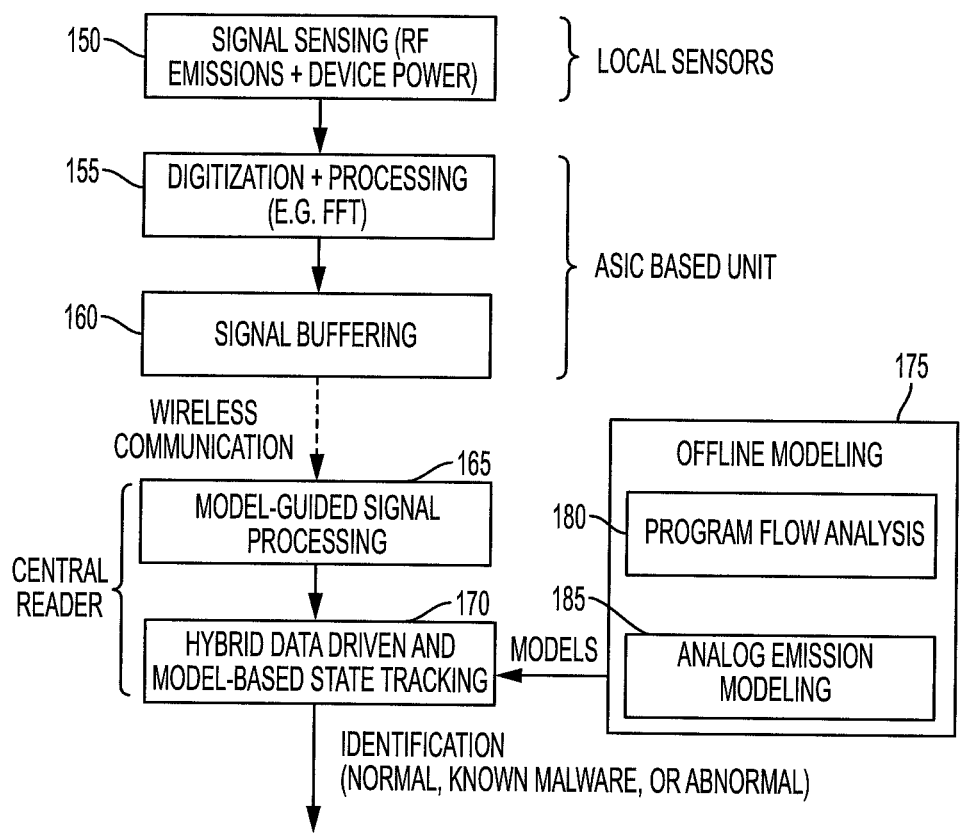
FIG. 1B illustrates a flowchart of a method that may be used in the embodiment of FIG. 1A.

FIG. 1B illustrates a flow chart of an embodiment including an ALARM system for monitoring EMSDs. A similar concept is applicable to devices such as thin clients and laptops. Through co-design of novel hardware and software elements, the ALARM system can achieve high accuracy instruction level tracking for EMSDs and identification of unknown code for thin clients and laptops at low cost.

With further reference to FIG. 1B, FIG. 1B shows signal sensing (RF emissions and device power) 150, digitization and processing (e.g., FFT) 155, signal buffing 160, model-guided signal processing 165, hybrid data driven and model-based state tracking 170, offline modeling 175, program flow analysis 180, and analog emission modeling 185.

Innovative system design leveraging near-field radio frequency (RF) sensing, high fidelity device modeling using micro-Kelvin temperature resolution sensors and program analysis techniques, and model-based signal processing and measurement analysis will enable:

(i) Instruction level tracking with greater than 95% accuracy at standoff distances of at least 15 feet for EMSDs; and (ii) Classification of known versus unknown code with greater than 80% accuracy at standoff distances of at least 15 feet for thin clients and laptops.

In some implementations, the ALARM system hardware includes two components: (1) local sensors placed in the vicinity (e.g., <1 foot) of the monitored device coupled with local signal acquisition, buffering, and wireless communication electronics; and (2) a central reader monitoring multiple devices via data obtained over a wireless communication channel. The local sensors will capture involuntary radio-frequency (RF) emissions and device power consumption. RF emissions may be sensed using meta-material inspired antennas with patterns customized (easily and cheaply by printed electronics technology) for each class of embedded mission-specific devices (EMSDs).

In some implementations, local antennas sense information-rich near-field electro-magnetic (EM) emissions that fade away within inches of the monitored device. Such antennas show promising early results for detecting attacks. They also provide information about the power consumed by a main processor sensed as the amplitude of the clock frequency. Device power may also be sensed by augmenting the monitored device with a low-cost chip-scale power sensor. A small Hall Effect current sensing circuit may be used, and pulse width modulation (PWM) will allow the output to be transmitted to the same local antenna. The analog RF and power data received by the antenna may be digitized, processed, buffered, and communicated to the central reader over an 802.11 wireless communication channel using a custom ASIC-based local unit. The local chips may buffer the measurement data over a long window of time (sufficient to contain one complete execution of the program cycle to prevent critical packet losses) before forwarding the entire buffer to the central reader. The central reader will be a computing platform receiving data from the local sensors and running analytics software to detect and diagnose malware.

The ALARM system is a low cost and readily applicable to a wide range of use cases. The main components of cost are the local electronics and the central reader. Even with Commercial, Off-the-Shelf (COTS) components, the local electronics (Digital Signal Processing+Wi-Fi chips) cost less than $20 for medium volumes (<5,000 units). Going to an ASIC with higher volumes will bring down the cost by a factor of 10. The central reader requires a more powerful processor, but its cost will be amortized over the large number of devices (>5) it can be used to monitor.

Figure 2:
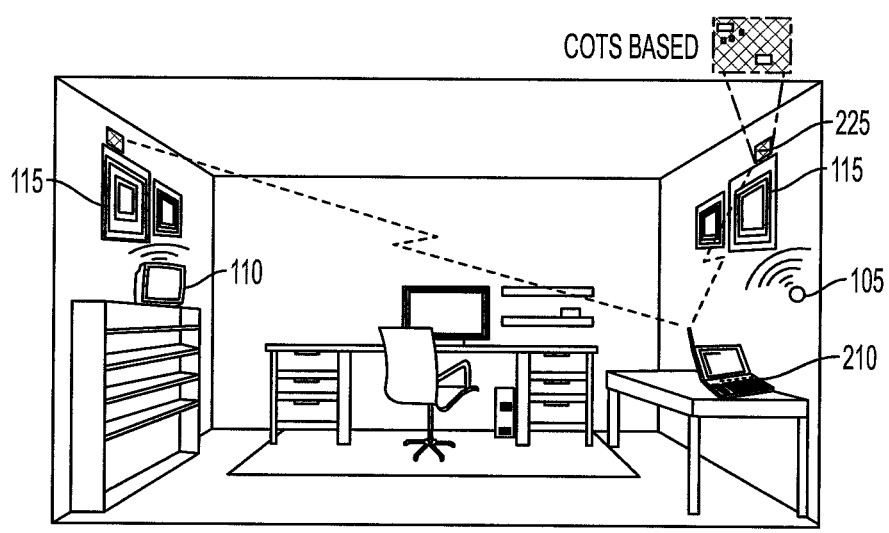
FIG. 2 illustrates another embodiment.

FIG. 2 shows another embodiment. The embodiment shown in FIG. 2 is different from the embodiment of FIG. 1A in two ways. First, a laptop 210 is used to act as a surrogate for the central reader. Second, a printed circuit board constructed out of COTS components 225 replaces the custom ASIC chips 125. The system in FIG. 2 has much lower one-off cost than the system in FIG. 1A but is functionally identical, making it a more efficient use of project resources.

The ALARM system software at the central reader is capable of supervising multiple EMSDs. The reader may process the data stream from the local sensors with low latency (the primary latency component being the buffering window length described earlier). The software components include model guided signal processing, and hybrid data-driven and model-based state tracking (see, e.g., FIG. 1B).

Figure 3:
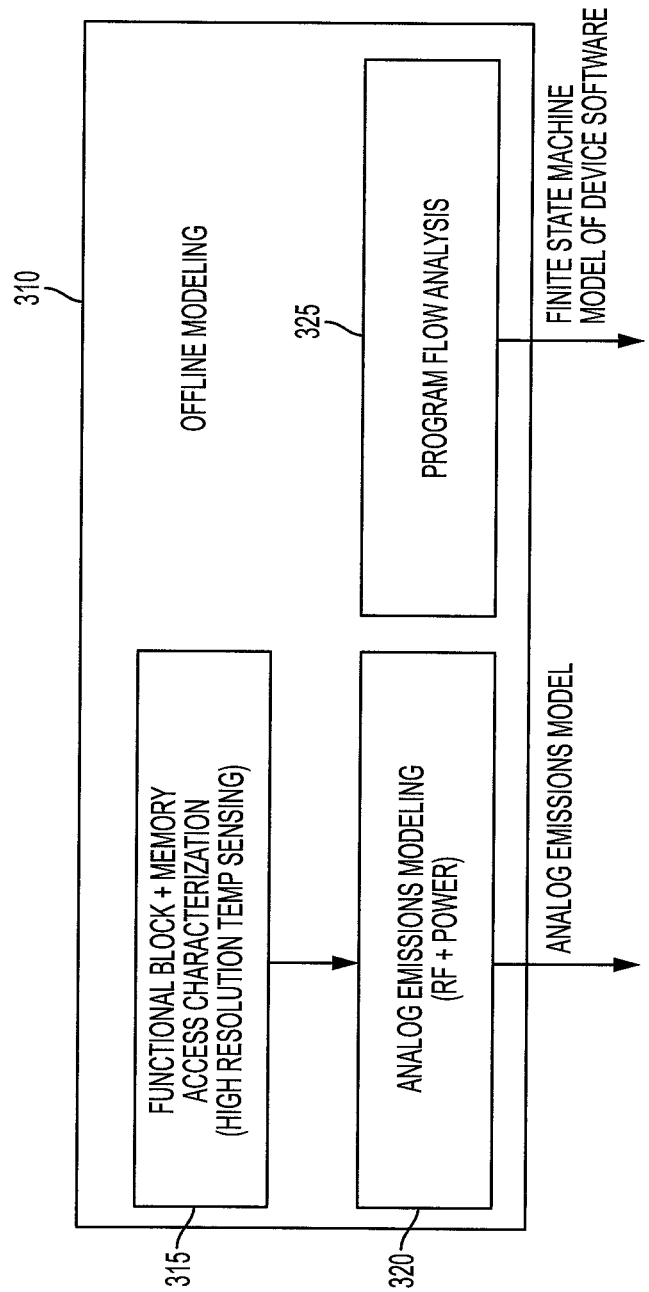
FIG. 3 illustrates a block diagram of an embodiment.

The online software relies on several models built offline (shown in FIG. 3). With reference thereto, FIG. 3 shows an implementation in which program flow analysis and analog emissions modeling is performed offline. These models include finite state machine models of the program code, and device emission models. The finite state machine model of the device firmware/software may be created through program flow analysis. Device emission models may be generated using a combination of physics-based and empirical techniques. High-resolution temperature sensing (micro-Kelvin resolution) using thermo-chromic materials may be used to characterize memory access patterns and functional blocks that are activated upon the execution of an instruction or code block. This characterization provides critical input to build accurate device machine models, which map the state of the program to RF and power emissions.

With further reference to FIG. 3, depicted is offline modeling 310, functional block and memory access characterization (high resolution temp sensing) 315, analog emissions modeling (RF and power) 320, and program flow analysis 325.

In one aspect, high-resolution temperature sensing using thermo-chromic materials enables creation of high fidelity models of power consumed and RF emissions.

ALARM does not utilize software boosting, but instead relies on innovative sensing and high fidelity analog emissions modeling.

The ALARM approach addresses several significant challenges. Modern-day software design and fast clock speeds minimize far-field analog signatures of operations, making it difficult to diagnose device operation with instruction-level fidelity. While the far field signals could be boosted with special software running on the device (Callan, Robert, Alenka Zajić, and Milos Prvulovic. "FASE: finding amplitude-modulated side-channel emanations." *Proceedings of the 42nd Annual International Symposium on Computer Architecture.* ACM, 2015.), such an approach is not readily applicable to a COTS device. Instead, this may be overcome with a combination of near-field sensing technology and a high-fidelity modeling approach. Another key challenge is to build a system that can be easily deployed, almost in a plug-and-play fashion. While conventional antennas would lack the required sensitivity or be too large to be practical, the approaches described herein enable customization and size reduction of the local sensors (e.g., near-field RF antenna size of ~2% of wavelength or 0.32 m for a 16 MHz frequency), resulting in a more feasible deployment solution. The systems and methods described herein bring a tightly integrated multidisciplinary hardware/software approach to bear on these challenging problems, incorporating a broad range of specialties such as meta-materials, machine learning, signal processing, printed electronics, cyber-physical system security, and optical sensing.

One objective of the systems and methods described herein is to design hybrid device state tracking algorithms running on EMSDs using involuntary signals that are not measurable using currently available technology. "Hybrid" refers to the approach described herein of combining both model-based (for analog emission and program flow) and machine learning analytic techniques. While side channel emissions of digital devices have been studied at length for FCC compliance and hacking purposes, leveraging them for security is a very different proposition. Compliance is mainly focused on the power emitted in different spectral bands. Hackers know when to listen in on the side channels since they trigger the attack. Even so, they need to trigger the attack many thousands of times to average out the noise in the signals and recover the data they are seeking (typically encryption keys). This method works because the attacker only has to succeed once in tens of thousands of tries. But, in order to use these same side channels for security, abnormal operations must be detected within seconds to minutes of starting. It is not acceptable to let the attack execute thousands of times to obtain a clean enough signal to diagnose.

There is a need for sensors with resolutions and discriminating power far superior to the state-of-the-art. The systems and methods described herein leverage several deep competencies to attack that challenge head-on. Some embodiments use directly applicable patterned meta-material inspired antennas and thermo-chromic coatings capable of sensing signals undetectable to conventional instruments. As described herein, novel responsive material sensors provide a direct characterization of signals at the individual instruction level. The systems and methods described herein also characterize the temporal (e.g., change in RF spectra) and spatial change (e.g., temperature gradient across a chip) in these signals with code executions and memory access operations, under nominal and attack scenarios. On top of this signal model, some embodiments build a real-time state tracking and anomaly detection software layer by leveraging model-based diagnosis (Tropp, J. "Greed is good: Algorithmic results for sparse approximation." *IEEE Transactions on Information Theory,* 50.10 (2004): 2231-2242; Duarte, M. F., et al. "Distributed compressed sensing of jointly sparse signals." *Asilomar Conf. Signals, Sys., Comput.* 2005; Rabiner, Lawrence R., and Biing-Hwang Juang. "An introduction to hidden Markov models." *ASSP Magazine, IEEE* 3.1 (1986): 4-16; Park, Sung Cheol, Min Kyu Park, and Moon Gi Kang. "Super-resolution image reconstruction: a technical overview." *Signal Processing Magazine, IEEE* 20.3 (2003): 21-36) and machine learning capable of finding temporal, geospatial, and network anomalies in complex datasets (Li, Jingyuan, Tejaswi Tamminedi, Guy Yosiphon, Anurag Ganguli, Lei Zhang, John A. Stankovic, and Jacob Yadegar. "Remote physiological monitoring of first responders with intermittent network connectivity." In *Wireless Health* 2010, pp. 64-73. ACM, 2010; Eldardiry, Hoda, et al. "Multi-source fusion for anomaly detection: using across-domain and across-time peer-group consistency checks." *Journal of Wireless Mobile Networks, Ubiquitous Computing, and Dependable Applications (JoWUA)* 5.2 (2014): 39-58).

Innovative Aspects

The systems and methods described herein include many novel or advantageous features, including at least the following. First, there is the ability to sense involuntary near-field RF emissions in the MHz range with miniaturized antennas ~2% of wavelength, which allows for discreet distributed deployment. Second, there is the ability to sense micro-Kelvin temperature changes on the surface of the chip, allowing accurate characterization of functional blocks accessed by an instruction and memory access patterns. Third, there is the development of high-fidelity analog emissions modeling that leverages the characterization described above. Finally, there is the development and use of a hybrid of model-based and a machine learning approaches for both signal processing and state tracking.

Impact

Increases in network speed and size is driving the Internet-of-Things (IoTs), where any device with an on/off switch can connect online. Gartner, a technology research firm, projects the number of Internet-connected smart devices will reach 26 billion worldwide by 2020. However, small smart devices are often "the weakest links" in a network. The security vulnerability of IoTs, embedded, and mobile or portable devices can have major consequences on national security and the military. Smart meters are becoming increasingly ubiquitous in the nation's power grid and water system. A coordinated large-scale attack on these devices has the potential to generate unstable grid dynamics and adverse economic implications. The nation's transportation networks are equally vulnerable. Smart sensors used in traffic intersections are critical to smooth flow of traffic. An attack on these sensors can create massive gridlock leading to significant national security, economic, and social costs. Critical data centers can also be impacted, for example, by hacking into the cooling system via connected thermostats. In military facilities, IoTs have the potential for substantial cost reduction via improved asset tracking and facilities management. ("Continuing the march: The past, present, and future of the IoT in the military". http://dupress.com/articles/internet-of-things-iot-in-military-defense-industry/. Accessed on Nov. 12, 2015). However, IoT vulnerabilities pose a threat to the normal functioning of these facilities. Next generation military radios may also share the vulnerabilities of smart phones. (Id.). Modern military systems, such as the F-35 joint-strike fighter, use sensors to predict maintenance needs and communicate them to maintenance staff. (Id.). If these sensors are compromised, then the operations and life span of critical military equipment may be degraded.

In the civilian domain, IoT security has been making the news for the wrong reasons. Reports of smart light bulbs that leak Wi-Fi passwords are routine. Computer worms can get into hospital systems through CAT scan machines with built-in browsers for automatic updates. Additionally, large-scale security exploits such as Heartbleed and Shellshock bugs could become even more catastrophic if they take place across the Internet of things. The core problem in the consumer domain is that security and privacy have long been afterthoughts for IoT software and hardware developers. Technology developed in this project can help fill this void. The systems and methods described herein provide responsive material-based sensors that can be cheaply manufactured at scale by conventional lithography or screen-printing processes. The convenience of IoTs such as having appliances that turn on when we pull up in the driveway or refrigerators that order groceries as they run out must not come at the expense of compromised data. It is only by safeguarding privacy and security that this emerging technology can become a desirable option for mainstream consumers.

Technology Maturation Options

Two possible options for market-ready systems are the following.

First, one option is integrated thin-film antenna and signal processing circuitry. A flexible sheet-like transducer element can be mounted behind a device flush with the support surface. This thin transducer sheet can also be painted over to be optically invisible. In this configuration, the RF emissions from the IoT device will be picked up by a meta-material inspired antenna, but the antenna will feed the signal directly to the custom chip-scale detector attached to it for digital processing. This local monitoring package will be powered by the central reader, inductively or through RF scavenging.

Second, another option is ultra-miniaturized antenna as a sticker. There is a tradeoff in efficiency and gain in miniaturizing the meta-material antennas to the form factor of a 1"×1" sticker that can be directly mounted on the microprocessors inside the EMSDs. These antennas will be custom-made for devices of interest and powered either locally from the device or by thinfilm batteries. They can be designed to have a unique ID, similar to an RFID tag, which will enable a central reader to identify specific devices in the field. The reduction in gain due to miniaturization of the antenna can be compensated for by improved proximity, advanced noise rejection, and extensive training of the models used in malware detection.

Sustainment Risks and Mitigation

Advantageously, the specific elements of ALARM are resilient to sustainment risks. Digitally printed antennae and devices can be rapidly co-evolved with emerging technologies. Physics based models can be efficiently generated for new processors using our high-resolution thermal sensing approach, and machine learning techniques can accommodate evolving programming norms. Even in the rapidly evolving world of information technology, ALARM offers a fundamental approach that will remain viable for the foreseeable future.

Research Challenges

The high-level research challenges and linkage to our integrated hardware/software approach are summarized below. Rows 1 "measurement" and 3 "knowledge" correspond to software; rows 2 "modeling" and 5 "system design" correspond to hardware; and row 4 "distinguishability" corresponds to combined hardware/software elements.

TABLE 1 examples of high-level research challenges.

| Research Area | Challenge | Approach |
|---|---|---|
| 1. Measurement | Due to bandwidth and hardware constraints, the measurement sampling occurs at a lower rate than the rate of change of instructions. Thus, the analog emissions measured at any time are a mixture of emissions generated by individual instructions. A key challenge lies in recovering the individual contributions from the mixed measurement. | Leverage ideas from sparse coding. |
| 2. Modeling | The analog emissions generated by the execution of an instruction depend on extraneous factors such as preceding or following instruction, and the data being operated on (Eisenbarth, Thomas, Christof Paar, and Björn Weghenkel. "Building a side channel based disassembler." Transactions on computational science X. Springer Berlin Heidelberg, 2010. 78-99). It will require a large number of experiments to adequately cover all possible combinations of extraneous factors. Building a model from pure data is impractical (Rethinagiri, Santhosh Kumar, et al. "System-level power estimation tool for embedded processor based platforms." Proceedings of the 6th Workshop on Rapid Simulation and Performance Evaluation: Methods and Tools. ACM, 2014). | Build hybrid emission models.. |
| 3. Knowledge | For COTS sensors and actuators, very little knowledge about the device firmware will be available. Constructing a model of the device firmware from purely observing the executions is another key challenge. | Apply program flow analysis. |
| 4. Distinguishability | Near-field RF emissions are more information rich but also harder to measure in a compact and discreet set-up (Kraz, Vladimir. "Near-field methods of locating emi sources." RF EXPO WEST. 1995). | Optimized geometry for RF sensor design. |
| 5. System Design | The entire system must be easy to deploy, low cost, and operate at reasonably large standoff distances. | Create design with low-cost, small form-factor local sensors communicating with a remote reader. |

Project Overview

Figure 4:
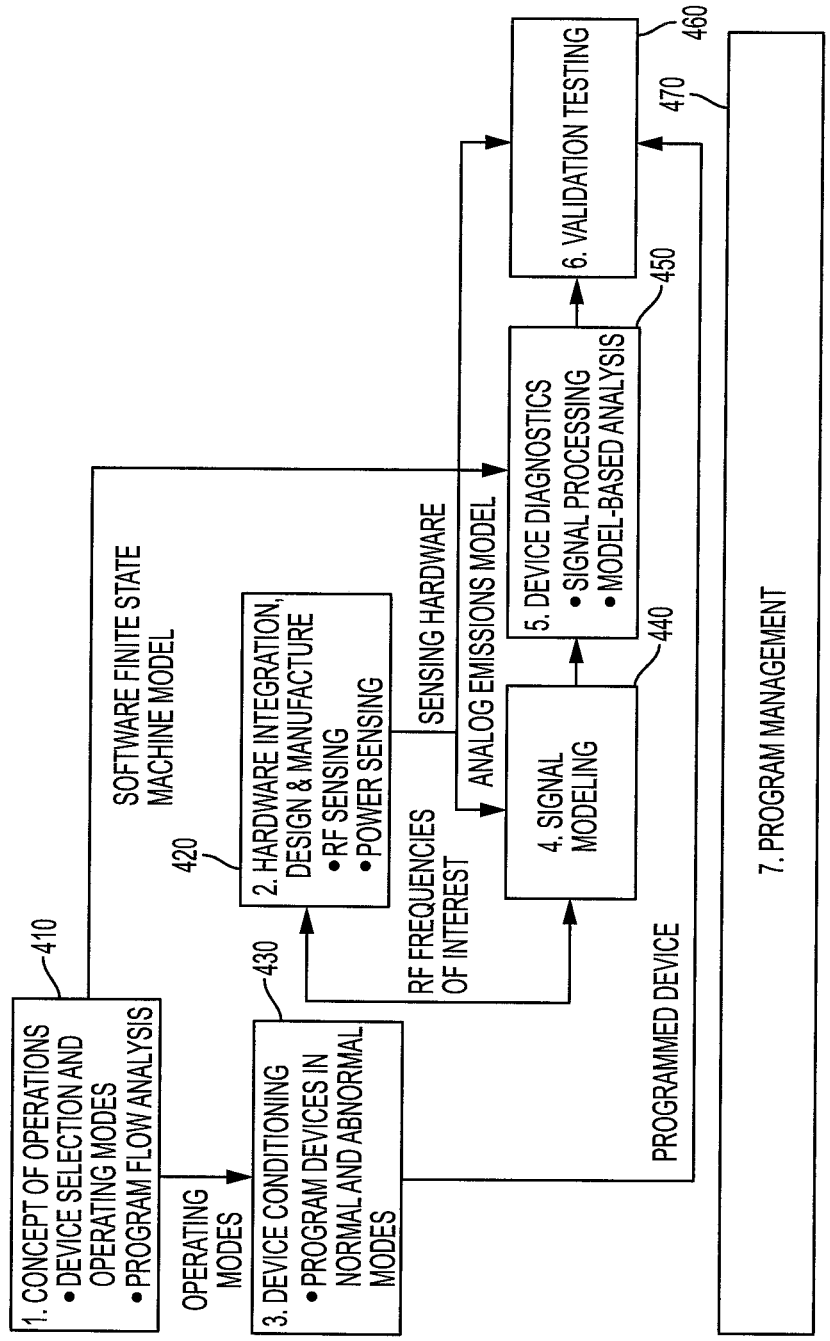
FIG. 4 illustrates an embodiment including Analog Logic Analysis using Responsive Materials (ALARM) task structure, and showing project flow and interdependencies.

FIG. 4 shows ALARM task structure showing project flow and interdependencies. These tasks are described in detail in the following sections. The following descriptions address the problem of instruction-level tracking for EMSDs, and unless stated otherwise, the same approaches are valid for coarser level tracking (e.g. control-flow tracking) and for more complex devices (e.g. thin clients and laptops). With further reference to FIG. 4, FIG. 4 shows concept of operations 410, hardware integration design and manufacture 420, device conditioning 430, signal modeling 440, device diagnostics 450, validation testing 460, and program management 470.

Concept of Operations

One objective under this task is to define a representative operational scenario where the ALARM system might be deployed. Another objective is to conduct program flow analysis to build a model, a finite state automaton, of the device software.

One operational scenario definition involves, among other things, specifying the types of devices to be monitored, the number of devices, distance between them, and sources of noise and interference.

Device Selection

In order to help resolve device operation at the instruction level, it is beneficial to gain as much detailed knowledge of the device hardware, firmware, program, and data as possible. This information may not be readily available for many commercial devices on the market today, but is often shared by device manufacturers under proper agreements. To further mitigate the risk, the approaches described herein consider equivalent developer platforms for each device class of interest—IoTs, embedded devices, thin clients, and smartphones/laptops. Table 2 lists the device classes, their characteristics, examples, and developer platforms of equivalent hardware and instruction set complexity. It is assumed that IoT and Embedded devices can operate in several modes (each mode can be thought of as a program) but is present in exactly one mode at any given time, and the modes change infrequently.

consuming and difficult task: the sheer complexity and ever-evolving software systems make it difficult to create and maintain a model that accurately captures the current state of the software system. However, models of the software can be inferred from a set of executions using machine-learning techniques to support the other modules in the ALARM workflow. Depending on the nature of the generated models, these techniques fall into two categories: (i) automaton-based techniques (e.g., S. Forrest, S. A. Hofmeyr, A. Somayaji, Intrusion Detection using Sequences of System Calls, Journal of Computer Security Vol. 6 (1998) pg 151-180; I. Krka, Y. Brun, and N. Medvidovic, "Automatic mining of specifications from invocation traces and method invariants," in Proceedings of the 22nd ACM SIGSOFT International Symposium on Foundations of Software Engineering, (FSE-22), Hong Kong, China, Nov. 16-22, 2014, 2014, pp. 178-189; M. Acharya, T. Xie, J. Pei, and J. Xu. Mining API Patterns as Partial Orders from Source Code: From Usage Scenarios to Specifications. In proceedings of the 6th joint meeting of the European Software Engineering Conference and the ACM SIGSOFT International Symposium on Foundations of Software Engineering, 2007; G. Ammons, R. Bodik, and J. R. Larus. Mining Specification. In proceedings of the 35$^{th}$ Annual ACM SIGPLAN-SIGACT Symposium on Principles of Programming Languages, 2002); and (ii) non-automaton-based techniques (e.g., M. Ernst, J. Cockrell, W. Griswold, and D. Notkin. Dynamically discovering likely program invariants to support program evolution. IEEE Transaction on Software Engineering, 27(2):99-123, February 2001; D. Lo, S.-C. Khoo, and C. Liu. Mining temporal rules for software maintenance. Journal of Software Maintenance and Evolution: Research and Practice, 20(4):227-247, 2008).

Forrest et al (S. Forrest, S. A. Hofmeyr, A. Somayaji, Intrusion Detection using Sequences of System Calls, Jour-

TABLE 2

Device classes, characteristics and examples.

| Device Type | Clock Speed | Hardware Characteristics | Software/ Firmware Characteristics | Examples | Developer Platforms |
|---|---|---|---|---|---|
| IoT Device | 10 Mhz-100 MHz | Microcontroller architecture, 1 Kb-1 Mb RAM, serial communication | <10 operation modes (each mode includes repetition of a finite set of instructions) | Arduinos, smart light bulbs, smart locks, heart-rate monitors | Arduino Uno, Arduino Due, Intel Galileo Gen 2, MBED |
| Embedded Device | 10 MHz-750 MHz | SoC, 128 Mb-512 Mb RAM, storage, networking | <100 operation modes (each mode includes repetition of a finite set of instructions) Advanced sensing and control | Learning thermostats, Internet connected cameras, routers | Raspberry Pi, Altera Cyclone FPGA, Lego Mindstorm |
| Thin Client | 1 GHz-2 GHz | 1-2 cores, 1 Gb-2 Gb RAM, keyboard, display, advanced networking | No fixed set of operation modes | Chromebox, Small PC | Chromebox, Android based Mini PCs |
| Smart Phone or Laptop | 1 GHz-2 GHz | Multi-core, 1 Gb-2 Gb RAM, low-power CPU, small factor, multiple radios | No fixed set of operation modes | Apple iPhone, Samsung Galaxy, Windows PC, Macbooks | Android Dev. Phone, PCs, Macbooks |

Program Flow Analysis

The objective of program flow analysis is to build a probabilistic finite state machine model of the device software. Modeling software systems is an extremely time nal of Computer Security Vol. 6 (1998) pg 151-180) have shown that program behavior learned from execution traces is a promising technique towards automatically developing effective intrusion detection techniques. The approach proposed in Forrest et al characterizes normal behavior by breaking a system call sequence into substrings of a fixed length N (the so-called Ngrams). The limitation of using Ngrams is that the learning algorithm becomes on the one hand inefficient for small N, and on the other hand intractable for large N.

A more promising approach is to infer program behavior from the execution traces as finite-state automata (e.g., Forrest et al; I. Krka, Y. Brun, and N. Medvidovic, "Automatic mining of specifications from invocation traces and method invariants," in Proceedings of the 22nd ACM SIGSOFT International Symposium on Foundations of Software Engineering, (FSE-22), Hong Kong, China, Nov. 16-22, 2014, 2014, pp. 178-189; M. Acharya, T. Xie, J. Pei, and J. Xu. Mining API Patterns as Partial Orders from Source Code: From Usage Scenarios to Specifications. In proceedings of the 6th joint meeting of the European Software Engineering Conference and the ACM SIGSOFT International Symposium on Foundations of Software Engineering, 2007; G. Ammons, R. Bodik, and J. R. Larus. Mining Specification. In proceedings of the 35$^{th}$ Annual ACM SIGPLAN-SIGACT Symposium on Principles of Programming Languages, 2002). Despite recent advances, there are still limitations that need to be addressed for the approach to scale and accurately characterize large, real systems. For example, finite state automations (FSAs) inferred using the k-tail algorithm are usually inaccurate for execution traces containing methods that frequently co-occur in particular orders, but are not required to occur exactly in these orders (I. Krka, Y. Brun, and N. Medvidovic, "Automatic mining of specifications from invocation traces and method invariants," in Proceedings of the 22nd ACM SIGSOFT International Symposium on Foundations of Software Engineering, (FSE-22), Hong Kong, China, Nov. 16-22, 2014, 2014, pp. 178-189). Moreover, state-of-the-art techniques for inferring a model of the system require detailed execution traces, which might be impossible in an industrial setting.

The systems and methods described herein consider an approach that infers a probabilistic FSA from a set of execution traces—automating model creation and therefore reducing human effort. To overcome current state-of-the-art approaches' limitations outlined in the previous paragraph, some approaches described herein first cluster the set of executions traces and compute a separate FSA for each cluster. Then, the set of computed FSAs is generalized into one FSA.

Collection of Execution Traces

Most operating systems provide mechanism to trace events, such as system calls, in the system—e.g., OpenBSM for MacOS, auditctl (Unix) and Process Monitor (Windows). There are even unifying toolsets that leverage the mechanisms and provide functionality to record audit trails for different platforms. In particular, the open source SPADE toolset (Support for Provenance Auditing in Distributed Environments) (Ashish Gehani and Dawood Tariq, SPADE: Support for Provenance Auditing in Distributed Environments, 13th ACM/IFIP/USENIX International Conference on Middleware, 2012) seems to suit well the trace collection of certain implementations described herein. To collect the traces, one approach described herein starts by applying fuzz testing (Godefroid, Patrice. "Random testing for security: blackbox vs. whitebox fuzzing." Proceedings of the 2nd international workshop on Random testing: co-located with the 22$^{nd}$ IEEE/ACM International Conference on Automated Software Engineering (ASE 2007). ACM, 2007), including the usage of grammars to aid in generating well-formed inputs. Other techniques to drive the software system to states of interest are symbolic and concolic execution (Farzan, Azadeh, Andreas Holzer, and Helmut Veith. "Perspectives on White-Box Testing: Coverage, Concurrency, and Concolic Execution." Software Testing, Verification and Validation (ICST), 2015 IEEE 8th International Conference on. IEEE, 2015). To obtain diversity in the executions, one approach described herein employs techniques to guide the test generation process to generate tests that maximize information gain (Gonzalez-Sanchez, A., Abreu, R., Gross, H. G., & van Gemund, A. J. (2011, August). Spectrum-Based Sequential Diagnosis. In AAAI; Campos, J., Abreu, R., Fraser, G., & d'Amorim, M. (2013, November). Entropy-based test generation for improved fault localization. In Automated Software Engineering (ASE), 2013 IEEE/ACM 28th International Conference on (pp. 257-267). IEEE).

Several research questions, including the following, will be addressed under program flow analysis. What is the required instrumentation detail to develop a model with a high degree of fidelity? Given that the model is learned from execution traces, how do we quantify the level of uncertainty in the model? How much more learning is needed? What is the fitness function for automatic test generation techniques to maximize the information gain of the model generation technique? Techniques that are based on source code are not covered because it is intended to have a technique that can handle both open and closed (third party, COTS) source software.

Instruction Occurrence Profiles

A by-product of the program flow analysis is the frequency of occurrence of individual instructions in programs. This provides a more informed prior on the initial state of the program when applying our model-based analysis technique for program tracking.

Device Conditioning

The selected devices will be programmed in normal and abnormal modes. The following abnormal modes are relevant to preventing technological surprise:

Type 1: Distributed denial-of-service attacks in which the computational resources of a device, or a network of devices, have been diverted to tasks other than normal operation.

Type 2: Subtle, long-range acts of sabotage, such as attacks on infrastructure perpetrated by the StuxNet worm, which are not detected by conventional means of monitoring a control system.

Type 3: Drastic, immediate acts of sabotage, such as attacks on critical infrastructure such as railway switches, or hazardous gas monitors.

The abnormal code corresponding to the above three types of attack are different. Type 1 may involve extra operations in addition to the normal operations. Type 2, on the other hand, may involve minor changes in algorithm or process parameters without changing the overall program structure. This type of attack is probably the hardest to detect. Type 3 may involve significant changes to the program and may be easier to detect than the other two types. The selected devices will be programmed with normal and at least one abnormal code from each of the three abnormal modes. The programmed devices will be used for testing and validation of ALARM. For this task, security experts will be assisted by a cyber-security consultant.

Hardware Integration, Design and Manufacture

In some embodiments, RF and power sensors are key enablers for ALARM.

Meta-Material Inspired Near-Field RF Sensors

For detecting patterns in involuntary RF emissions of devices the key-enabling technology is a printed meta-material antenna, which is placed in the vicinity of devices (<1 foot), for picking up hard-to-detect RF signatures in the MHz frequency band. This approach relies on the fact that any circuit or device generates continuous noise. And, in the case of IoT or small electronic devices, the more stable and predictable signals are in the tens of MHz frequency range. These distinct signatures, arising from various origins in the system such as processor clocks, non-linear components in the device, and mixing byproducts, can be reliably exploited to spot anomalies and malicious software attacks.

Since these signatures are in the low-frequency MHz range, in principle, large dipole antennas on the order of ~15 m (50 ft) are required for detecting them. Antennas of this size are obviously impractical to use in most settings. In practice, high gain horn antennas could also be used as substitutes to these oversized antennas, but they are not sensitive enough. Thus, RF signatures are hard to detect primarily because of the unavailability of practical-sized antennas.

Figure 5:
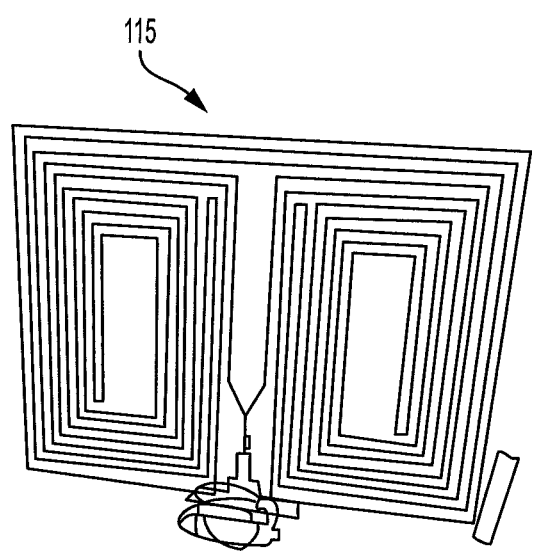
FIG. 5 illustrates an embodiment of an electrically-small (<$\lambda/40$ or 22 inch) 13.56 MHz meta-material inspired antenna.

Some embodiments involve a new class of printed electrically-small ($<\lambda/40$ for both the length and width of the antenna; where $\lambda$ is the wavelength of operation), ultra-thin ($<<\lambda$ depth) meta-material antennas, which can be leveraged to dependably sense low-frequency signals. An example of a printed meta-material antenna 115, with peak operating frequency of 13.56 MHz ($\lambda=22$ m or 72 ft.) and length scales of ~55 cm (22 in.) is shown in FIG. 5. In this architecture, the meta-material pattern consists of a double square metallic spiral—a unique geometry designed from utilizing meta-material design principles. In certain embodiments, these low-cost meta-material antennas may be mass-produced on flexible substrates.

The systems and methods described herein allow for antenna design optimization via rapid, low-cost manufacturing and testing.

Metamaterials are artificially engineered structures that have provided a promising methodology to design electrically small antennas. Meta-material-based antennas are radiators made up of ideal homogenized meta-materials, such as antennas surrounded by a double negative (DNG) meta-material shell, antennas loaded with a mu-negative (MNG) substrate, or antennas retrofitted with an epsilon negative (ENG) backplane. Meta-material inspired antennas are those radiators obtained by applying the meta-material design principles, but that are constructed from conventional antennas loaded with subwavelength metallic inclusions. "Inspired" refers to the fact that the parasitic element or subwavelength metallic inclusion could be used as a unit cell to realize either an ENG, MNG, or DNG medium like a typical meta-material. Inclusions in meta-materials inspired antennas are meta-atoms and are typically electrically-small, ultrathin, and resistively matched to the source without any external matching network.

Proof-of-Concept for RF Sensing

To demonstrate the effectiveness of the proposed approach, a series of experiments was run on an Arduino device with a close-proximity meta-material antenna for sensing. The Arduino is a MEGA 2560 micro-controller board based on the popular ATmega2560. It possesses an 8-bit micro-controller clocked at 16 MHz, and has 8 Kb of static RAM. For completeness, control experiments were also performed on the Arduino using a broadband horn antenna. The experimental setup is shown in FIG. 5. In this setup, the antenna was connected to a spectrum analyzer, which analyzed the signals in the frequency domain. The rationale for using frequency domain, as opposed to time domain, is that in the frequency domain complex signals (i.e., signals composed of more than one frequency) are separated at their frequency components, and the level at each frequency is displayed. In the time domain, all frequency components of the signal are summed together and displayed, shadowing critical information.

In these proof-of-concept experiments, 4 test cases were run to demonstrate that it is possible to discriminate between 4 different operating states:

Case #1: The Arduino is not powered. The background spectrum is recorded.

Case #2: The Arduino is powered, but in an idle state (e.g., not doing anything).

Case #3: The Arduino is in normal operation mode. Internally, it is overwriting a RAM buffer of size 6 Kb with 0's and 1's.

Case #4: Simulations of a particular type of malicious software attack. Internally, it corresponds to writing 0's and 1's to a digital output (i.e., sending the information out to an external party).

Figure 6A:
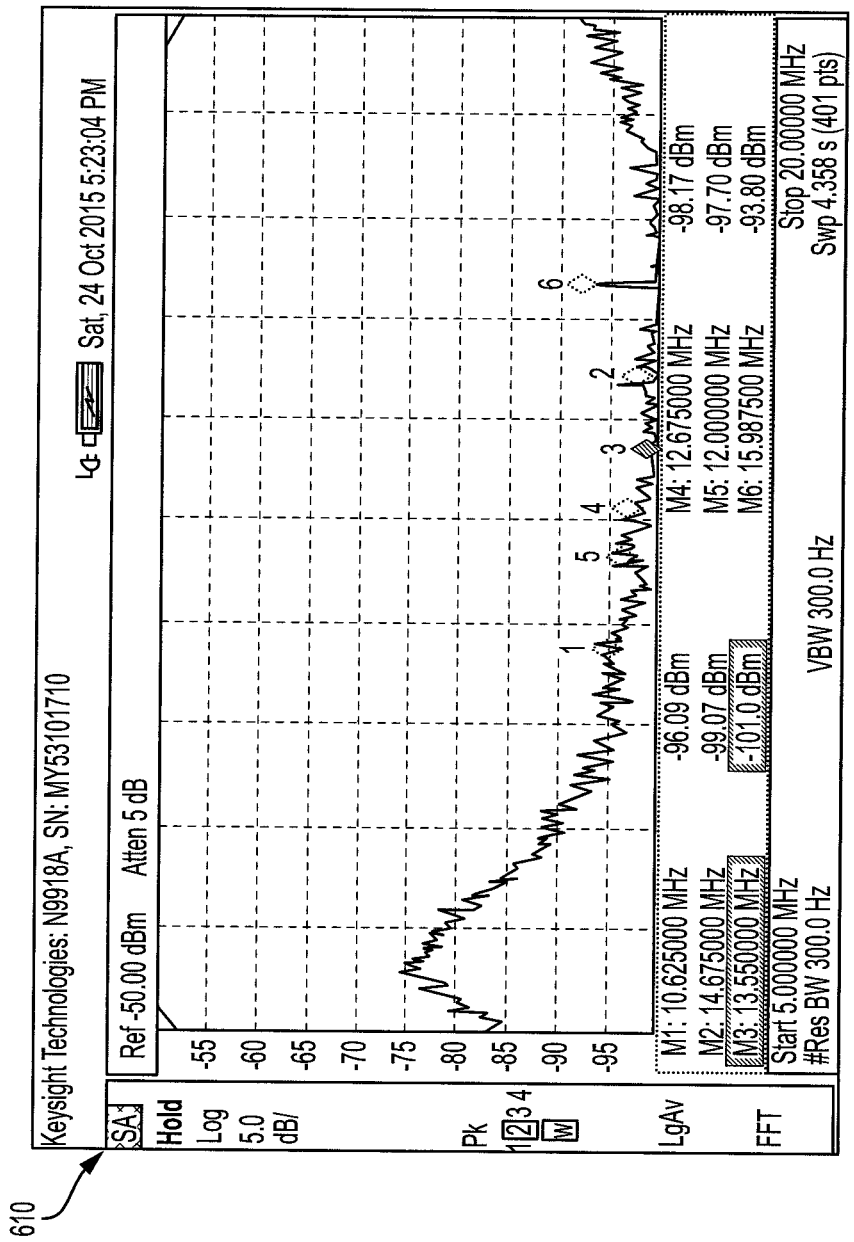
FIG. 6A shows the spectrum for the idle state (Case #2).
Figure 6B:
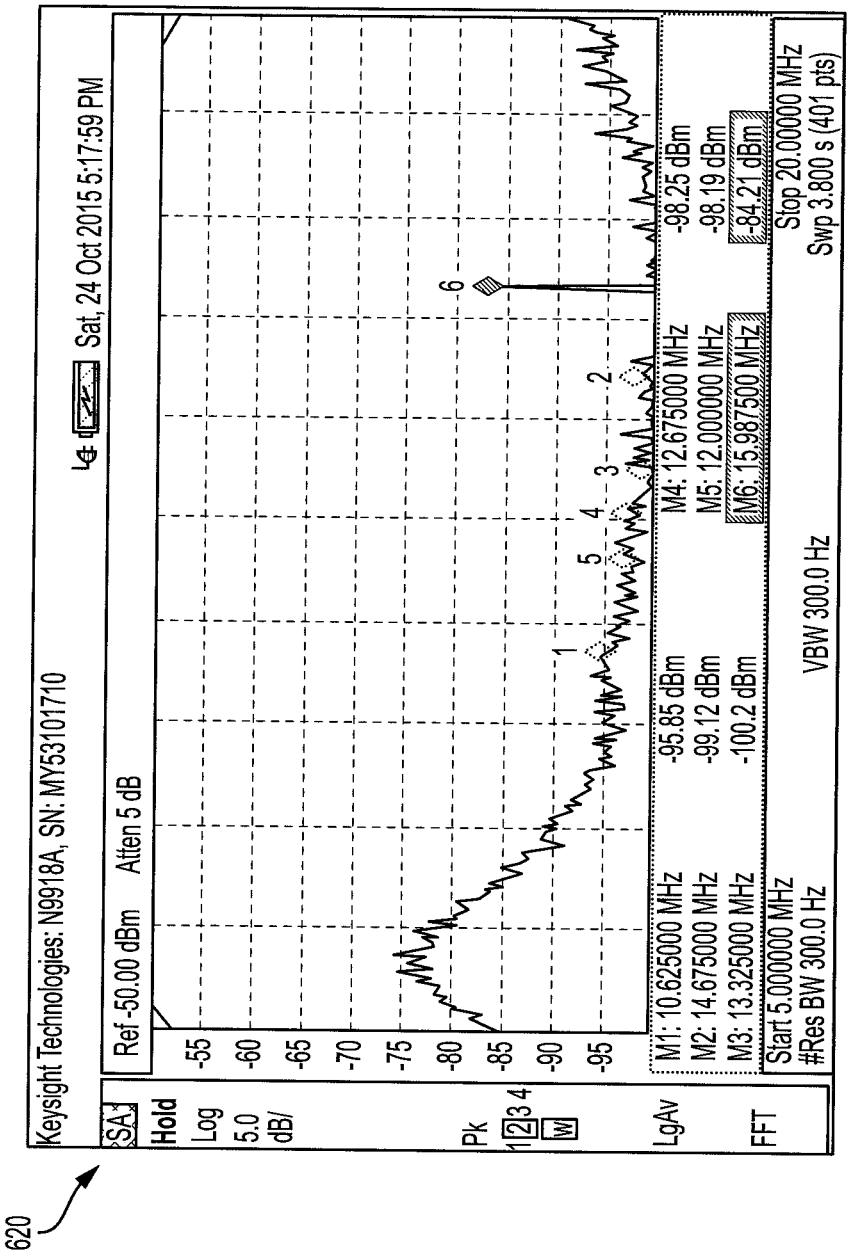
FIG. 6B shows normal operation (Case #3).

In these experiments, the spectrum analyzer was swept-tuned for displaying the RF signals. FIG. 6A shows the spectrum for the idle state (Case #2) 610. Normal operation (Case #3) 620 is shown in FIG. 6B. The increase in amplitude of the 16 MHz clock signal (M6 peak) of the Arduino was detected, serving as a proxy of power consumption.

It can be seen from FIGS. 6A and 6B that the antenna picked up the Arduino's clock signal at 16 MHz (M6 peak). It can also be seen that the amplitude of the clock signal (M6) is 3 times greater for normal operation than in the idle state. This is expected. The spectrum suggests that the clock is consuming more power.

Figure 7A:
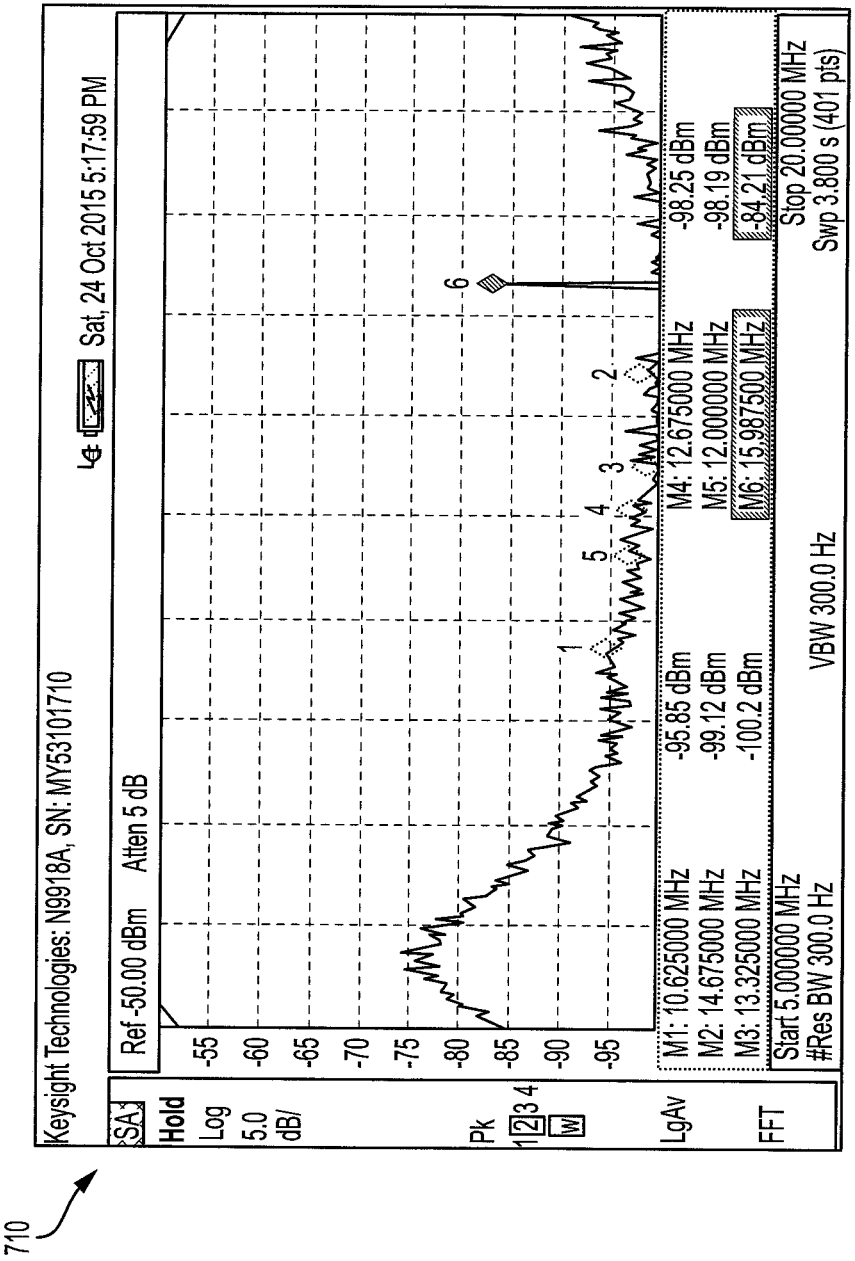
FIG. 7A shows an example of normal operation.
Figure 7B:
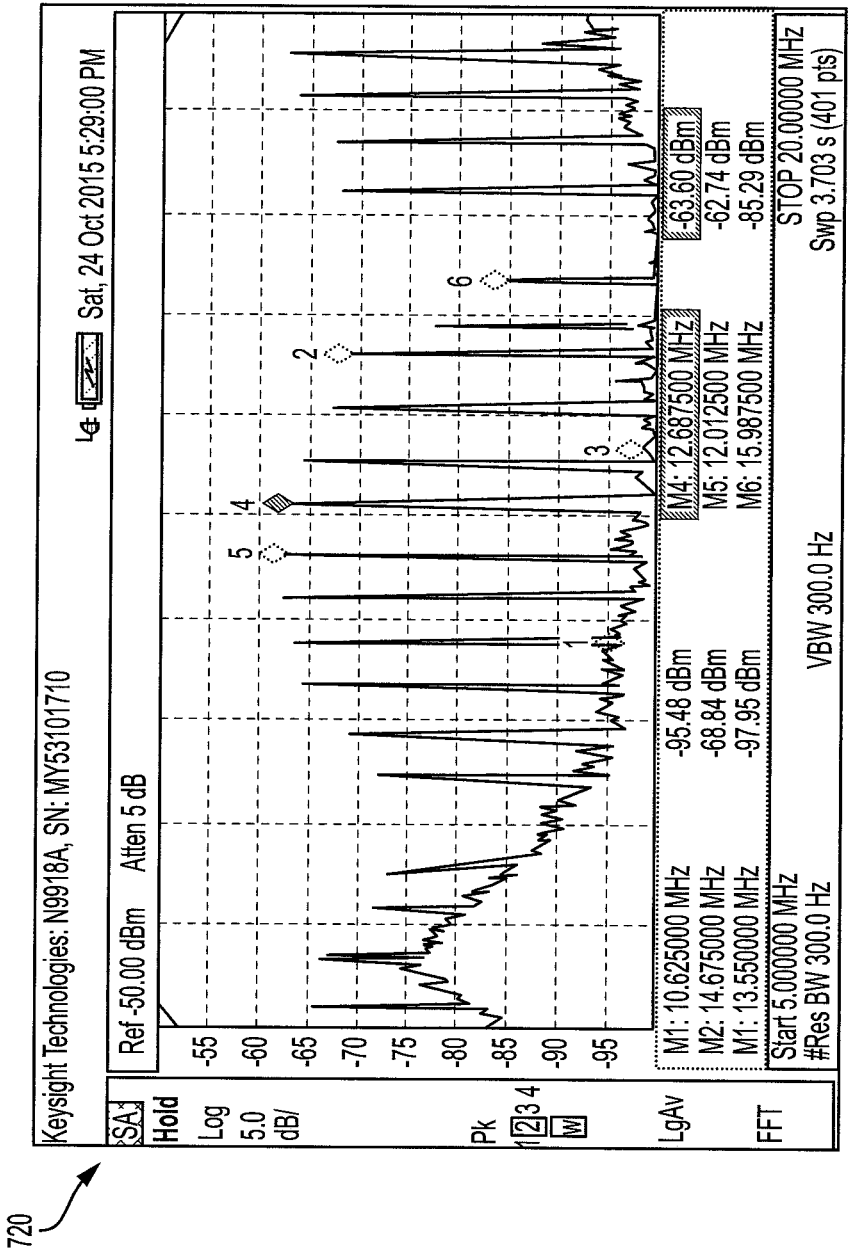
FIG. 7B shows an example of a particular type of malicious attack.

Finally, in FIG. 7B shows the spectrum for a particular type of "malicious attack" (Case #4) 720, which may be compared with the normal operation (Case #3) 710 shown in FIG. 7A. In this scenario, the Arduino was transmitting information out to an external party (i.e., writing 0's and 1's to a digital output). As seen in FIG. 7B, the signature for a malicious attack 720 is very distinct with several observable side-band peaks at various frequencies. Put another way, FIG. 7A shows a spectrum for the normal state (Case #3) 710; and, FIG. 7B shows simulated malicious software attack (Case #4) 720. The data obtained shows a clear signature, including multiple peaks.

In the control experiments, the meta-material antenna was replaced with a conventional broadband horn antenna, while leaving everything else constant. The same test cases were repeated, and the spectrum acquired for each scenario. The horn antenna did not pick up the previously observed MHz signals or signatures. This confirms that theses stable signatures, which are critical for robust detection of malicious attacks, are not easily detectable using conventional approaches. This set of preliminary experiments clearly demonstrates the advantages of the meta-material inspired antenna approach as described herein.

Power Sensing

In some embodiments, the RF and temperature sensing are augmented with power measurement. Power profile analysis has been shown to be effective at inflicting side-channel attacks as well as instruction level tracking in microprocessors (Eisenbarth, Thomas, Christof Paar, and Björn Weghenkel. "Building a side channel based disassembler." *Transactions on computational science X.* Springer Berlin Heidelberg, 2010. 78-99). Moreover, a combination of RF and power analysis has been shown to be more potent for side-channel attacks (Standaert, François-Xavier, and Cédric Archambeau. "Using subspace-based template attacks to compare and combine power and electromagnetic information leakages." *Cryptographic Hardware and Embedded Systems—CHES* 2008. Springer Berlin Heidelberg, 2008. 411-425). This motivates the need to fuse RF and power measurements.

There are several approaches to measure power. In one approach, a COTS power meter can be used. In another approach, using the amplitude of the clock frequency (as measured by our antennas) as a proxy of the power signal can be used. The systems and methods described herein develop a design for a low-cost chip-scale power sensor that will generate RF signals based on the variation in power consumed. For this it is planned to integrate a small Hall effect current sensing circuit into the device and then use pulse width modulation to generate the signal that could be received using the same antenna and receiver circuit that will be used for the RF signals.

Signal Modeling

An objective of this task is to create a mapping between analog emissions and the code block or instruction being executed. For simplicity's sake, the following will describe an approach using instructions with the understanding that the approach extends also to code blocks. Models will be built for RF emissions and power consumption. For the purpose of modeling and later discussion, consider that there are k instructions in the instruction set, denoted by (I1, I2, . . . , Ik).

RF Emissions Model

Figure 8:
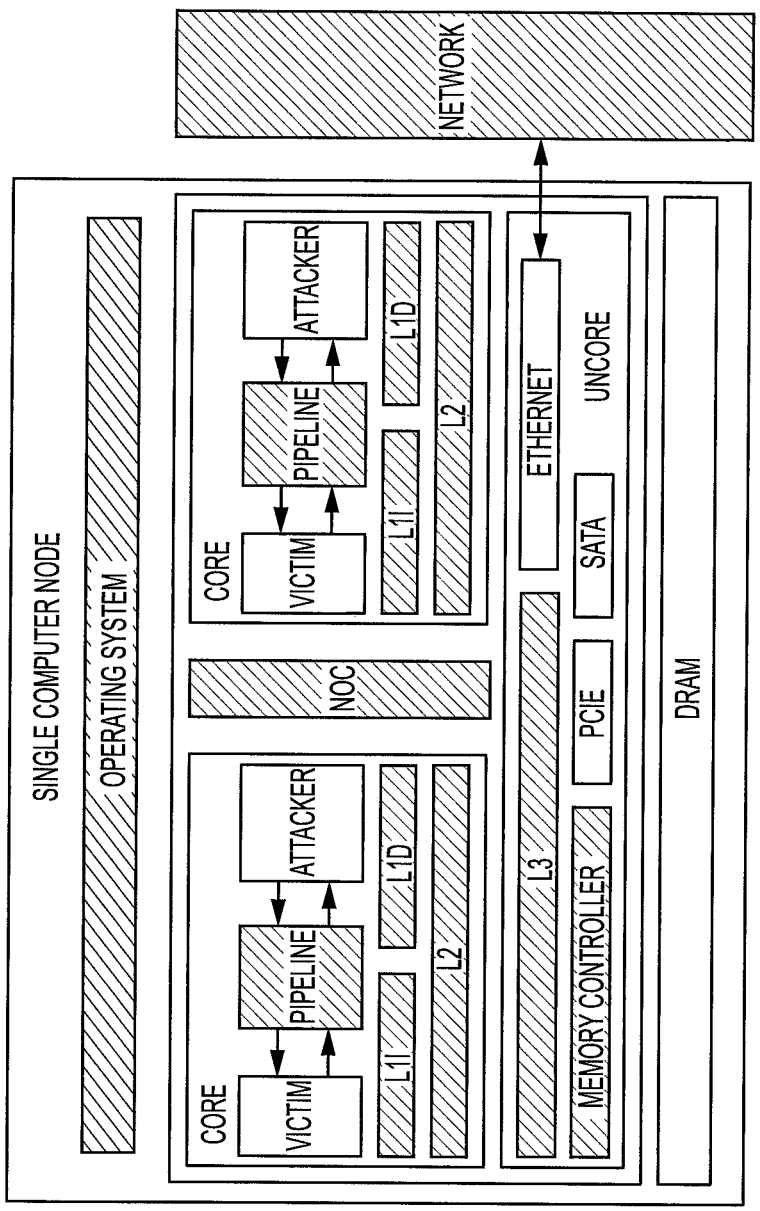
FIG. 8 shows an example of a typical microprocessor architecture with RF leakage sources shaded.

EMSDs, thin clients and laptops all emit involuntary RF emissions. FIG. 8 shows an example of a typical microprocessor architecture with RF leakage sources shaded. To build a model of these emissions, the monitored device may be instrumented using hardware similar to FIG. 5. For each instruction, test programs will be written containing several repeated executions of the instruction. The corresponding frequency spectra is recorded. Assume that the frequency is recorded at the points $(\omega_1, \omega_2, \ldots, \omega_M)$. Initially, the number of points M will be large. It will be necessary to select a subset of frequencies $(\omega_{s1}, \omega_{s2}, \ldots, \omega_{sk})$, frequencies from $(\omega_1, \omega_2, \ldots, \omega_M)$ where k<<M subject to the condition that the set $(\omega_{s1}, \omega_{s2}, \ldots, \omega_{sk})$ allows to create unique signatures for the k instructions. Not all the M frequencies can be used since the time to compute the spectrum increases linearly with the number of points at which the response is computed and M is a large number. If M is chosen too small to begin with, then it might not be possible to identify the frequencies with the most distinguishing features.

Selecting a subset of frequencies $(\omega_{s1}, \omega_{s2}, \ldots, \omega_{sk})$ can be accomplished as follows. Let $A_{js}$ be the frequency response of instruction j at $\omega_s$. Let A denote a matrix of size k×M whose (j,s)th element is Ajs. Using QR decomposition (Horn, Roger A., and Charles R. Johnson. *Matrix analysis.* Cambridge university press, 2012), it is possible to write A=QR, where Q is a square matrix of size k whose columns represent an orthonormal basis of A. The matrix R is an upper triangular matrix. Let $R_k$ denote the matrix restricted to the first k columns of R. Now, let $A_k=QR_k$. It is known that $A_k$ is rank k and contains k of the columns of A. The frequencies corresponding to the k columns of A represented in $A_k$ is the set $(\omega_{s1}, \omega_{s2}, \ldots, \omega_{sk})$.

For each instruction $I_j$, an objective is to build a conditional probability distribution $p(A_{j1}, A_{j2}, \ldots, A_{jk}|I_j)$ where $A_{js}$ is the frequency response at the frequency $\omega_{sj}$. Test experiments can be conducted to measure several samples of the frequency response vector $(A_{j1}, A_{j2}, \ldots, A_{jk})$. The probability distribution $p(A_{j1}, A_{j2}, \ldots, A_{jk}|I_j)$ can be constructed from the samples.

Power Consumption Model

Experiments may be conducted to measure the power consumption of the device. The power consumption data is a time series signal of the aggregate device power consumption. As in the RF emission modeling, one objective is to create a conditional probability distribution of $p(F_{j1}, F_{j2}, \ldots, F_{jT}|I_j)$ for each instruction $I_j$. Here $F_{jt}$ refers to a feature of the time series signal. As noted in (Eisenbarth, Thomas, Christof Paar, and Björn Weghenkel. "Building a side channel based disassembler." *Transactions on computational science X.* Springer Berlin Heidelberg, 2010. 78-99.), the power consumption for a given instruction depends on extraneous factors such as preceding or following instruction, and the underlying data. Creating a model using purely data driven approach is not feasible given the large amount of experimental data needed. Embodiments described herein use a hybrid approach leveraging Functional Level Power Analysis (FLPA) (Laurent, Johann, et al. "Functional level power analysis: An efficient approach for modeling the power consumption of complex processors." *Proceedings of the conference on Design, automation and test in Europe—Volume* 1. IEEE Computer Society, 2004). FLPA relies on the identification of a set of functional blocks, which strongly influence the power consumption of the target platform (Rethinagiri, Santhosh Kumar, et al. "System-level power estimation tool for embedded processor based platforms." *Proceedings of the 6th Workshop on Rapid Simulation and Performance Evaluation: Methods and Tools.* ACM, 2014). Examples of functional blocks are processor, memory and I/O peripherals. For each block, a power consumption model will be derived. The power consumption model is a function of the firmware (instructions per cycle, cache miss rate, external memory access rate) and the device architecture (frequency of processor, frequency of bus) (Id.). Moreover, the set of functional blocks might change over the duration of an instruction. This is evidenced by the temporally varying power consumption pattern during the execution of a single instruction (Eisenbarth, Thomas, Christof Paar, and Bjorn Weghenkel. "Building a side channel based disassembler." *Transactions on computational science X.* Springer Berlin Heidelberg, 2010. 78-99). Building such a dynamic power consumption model is a key research challenge. In addition, the model can also include the effect of preceding or following instruction and data being operated on. The latter effects will have to be modeled stochastically since an explicit model will increase the computational burden involved in inferring the instruction from the observations.

Once a power consumption model for an instruction is generated, it is possible to generate simulated data from the model to construct the probability distribution $p(F_{j1}, F_{j2}, \ldots, F_{jT}|I_j)$. However, we still need to convert the time series power consumption data to the feature vector $(F_{j1}, F_{j2}, \ldots, F_{jT})$. This will be discussed later in the with respect to signal processing.

The systems and methods described herein build a dynamic power consumption model for instruction I given by:

$$\text{Power}(I,t) = \Sigma_{i=1}^F \delta_i(t) g_i + E, 0 \leq t \leq T$$

where t is the time, T is the maximum duration of I, $\delta_i(t)=1$ if functional block i is active at time t and $=0$ otherwise, F is the total number of functional blocks for the device, $g_i$ is the power consumption model for functional block i and E is a stochastic noise component.

Instruction Specific Functional Block Characterization

In some embodiments, the set of functional blocks that are influenced by each instruction in the instruction set are identified. For accurate identification, high-resolution temperature change detection of the device surface may be used. In particular, thermo-chromic materials for micro-Kelvin temperature changes may be used. Temperature mapping of PCB boards and their individual components (e.g., processors, batteries and antennas) is easily accomplished with commercial thermal imagers. However, these devices are usually limited in their capabilities with respect to spatial, temporal, and temperature resolution (typical: VGA, 60 Hz, >20 mK). The approaches described herein, on the other hand, allows to measure temperature distributions on the device with high fidelity and resolution in order to capture both spatial and temporal variations at a fine level.

Figure 9:
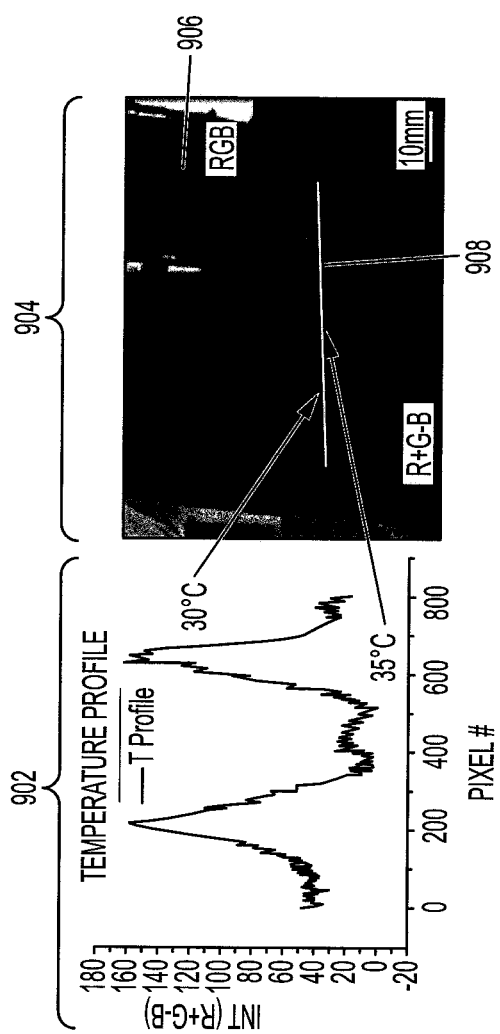
FIG. 9 shows a RGB image, and a temperature profile through part of the RGB image.

Some embodiments apply thermo-chromic coatings/overlay stickers to PCB boards and active devices and measure temperature distributions on these components by the color change of the thermo-chromic material. Thermo-chromic liquid crystals (LC) are probably the best-known thermo-chromic material, because they are used in every-day products such as colorimetric thermometers for infants, aquariums, and on batteries. Thermo-chromic LC exhibit wavelength shifts of up to 1000 nm/K (Parsley, M. "The use of thermochromic liquid crystals in research applications, thermal mapping and non-destructive testing." *Semiconductor Thermal Measurement and Management Symposium, 1991. SEMI-THERM VII. Proceedings., Seventh Annual IEEE. IEEE,* 1991) and can be easily spray coated (LCR Hallcrest, http://www.hallcrest.com) onto many surfaces. They have also been used in non-destructive testing of printed circuit boards (Parsley, M. "The use of thermochromic liquid crystals in research applications, thermal mapping and non-destructive testing." *Semiconductor Thermal Measurement and Management Symposium, 1991. SEMI-THERM VII. Proceedings., Seventh Annual IEEE.* IEEE, 1991). In combination with color sensitive imaging techniques, RGB cameras being the least sophisticated of these techniques, temperature mapping can be performed with very high spatio-temporal temperature resolution. In FIG. 9, a plastic support structure was spray coated with a commercial thermo-chromic liquid crystal coating that exhibits a spectral shift of ca. 60 nm/K. A temperature map, or a temperature gradient map, which is more robust against background temperature fluctuations, can be generated from a simple RGB image (upper right corner), resulting in <10 μm resolution temperature images. Visible cameras tend to have much higher resolution (megapixel, up to 1000 fps) than infrared (IR) cameras. Ultimately, the time resolution is limited by the LC response time, which ranges between 1-4 ms (Dabiri, D. Digital particle image thermometry/velocimetry: a review, Exp. Fluids (2009) 46:191-241). To achieve best possible color discrimination, some embodiments use two monochrome cameras that image the same scene through the same optics, but with a dichroic mirror that splits the image. Therefore, one of the cameras records images from wavelengths that are smaller than the cutoff wavelength of the dichroic mirror and the other camera records images from wavelengths that are longer than the cutoff wavelength. This differential color readout can then be used to determine the wavelength centroid of the thermo-chromic LC coating.

FIG. 9 shows: a RGB image of thermo-chromic liquid crystal spray coated on plastic support 906; temperature image by adding red and green channel and subtracting blue channel 904; and temperature profile 902 through shaded line 908.

Memory Access Patterns

Memory-access requests follow a repetitive pattern based on the application running on it. Present-day compilers can analyze an application and attempt to predict its access patterns, but often the pattern is dynamic and thus hard to predict. Under such uncertainty it can be difficult to associate RF emission of memory operations with unique access patterns to different parts of the memory bank. The extreme sensitivity of the thermo-chromic materials will be leveraged here to measure the spatial temperature gradients along the surface of the active chips in order to associate RF emissions with different parts of the memory being accessed. This can help diagnose malware operations if program and data memory are stored separately and the expected memory access patterns are known.

Some embodiments use high-resolution temperature measurement using thermo-chromic sensing to characterize (a) the functional blocks associated with each instruction, and (b) memory access patterns.

Device Diagnostics

To diagnose the device software type, the measured RF and power emissions undergo signal processing followed by model-based analysis.

Model-Guided Signal Processing

Signal processing achieves at least the following objectives. First, for the power trace, signal processing extracts robust features for instruction characterization. Second, for the RF emissions, signal processing disaggregates the contributions of the individual instructions on the measured signal.

Wherever possible, certain implementations exploit knowledge of the underlying physical or measurement process. In other words, the signal processing is model-guided. For example, for RF emission disaggregation, certain implementations leverage the sparsity of the measurement process as explained later.

Feature Extraction for Power Analysis

Some implementations use shape-based features of the power signal for instruction analysis since they are more robust to the impact of extraneous factors.

The power trace over the duration of an instruction is a time series signal. It is possible to use the entire time series for instruction inference (Rethinagiri, Santhosh Kumar, et al. "System-level power estimation tool for embedded processor based platforms." *Proceedings of the 6th Workshop on Rapid Simulation and Performance Evaluation: Methods and Tools.* ACM, 2014). However, this leads to increased complexity especially given that not all parts of the time-series contain useful information. Therefore, approaches described herein identify key features in the time series that are most informative. It may be seen that extraneous factors such as neighboring instructions or data being operated on can change the power consumption time series corresponding to a given instruction. However, certain shape descriptors of the time series can be relatively more robust to the impact of such extraneous factors. Examples of such descriptors can be found in (Xie, Jierui, and Mandis S. Beigi. "A scale-invariant local descriptor for event recognition in 1d sensor signals." *Multimedia and Expo, 2009. ICME 2009.*

*IEEE International Conference on.* IEEE, 2009; Ye, Lexiang, and Eamonn Keogh. "Time series shapelets: a new primitive for data mining." *Proceedings of the 15th ACM SIGKDD international conference on Knowledge discovery and data mining.* ACM, 2009; Hills, Jon, et al. "Classification of time series by shapelet transformation." *Data Mining and Knowledge Discovery* 28.4 (2014): 851-881). Some implementations use one or more such descriptors in creating the feature vector for instruction analysis.

RF Emission Disaggregation

Some implementations measure the frequency response of the RF signal produced when the processors inside the embedded device execute instructions in a program. In some embodiments, the model rests on the assumption that every instruction in the instruction set results in distinctive RF emissions, as measured by the frequency response.

Suppose that the embedded device under examination has a clock frequency of C Hz. In the proposed measurement system, the frequency response of the RF emanations of this device is measured at a much lower speeds, for example once every T>>1/C seconds. Furthermore, each frequency measurement is not instantaneous, but is carried out over a small period of t<<T seconds. This is a physical requirement imposed by the need to sweep through a frequency range and gather the frequency response. Thus, at every measurement spread across t seconds, a monitor will capture, not the pure frequency response associated with a single instruction, but a mixture of frequency responses associated with a sequence of instructions. Some embodiments represent the measured vector of the mixed frequency responses for each measurement as:

$$y=mA+e$$

where e is an error term that accounts for noise in the system and inaccuracies in the RF emission model, m is a row vector of length k, whose elements correspond to the number of instructions executed by the program during the measurement window of t seconds, and A is the matrix defined in the RF emission model section, which describes the frequency response of the instruction set. Concretely, if there are 5 instructions in the instruction set and the 3rd instruction was executed twice, and the 5th instruction was executed once, then m=[0, 0, 2, 0, 1].

In one setup, m is unknown and must be estimated given the measurement vector y and the device characteristic A. As the setup is capturing several such measurements, the setup can stack up the y, e, and m vectors from each measurement to obtain:

$$Y=MA+E$$

where Y and E are the sequences of measurements and error terms, and each row of M contains a histogram of the instructions executed during the corresponding measurement interval. As the rows of M only contain the number of occurrences of a small group of instructions that were being executed in t-length intervals, M is a sparse matrix. In general, without the sparsity condition, the estimation of M is an ill-posed problem. However, sparsity opens up the possibility of using state-of-the-art sparse coding algorithms to accurately estimate M (Donoho, Di., and Michael Elad. "Optimally sparse representation in general (nonorthogonal) dictionaries via L1 minimization." *Proceedings of the National Academy of Sciences,* 100.5 (2003): 2197-2202; Fuchs, J. "On sparse representations in arbitrary redundant bases." *IEEE Transactions on Information Theory,* 50.6 (2004): 1341-1344). Specifically, certain implementations explore greedy algorithms such as those based on matching pursuits, because of their simplicity and low computational complexity (Tropp, J. "Greed is good: Algorithmic results for sparse approximation." *IEEE Transactions on Information Theory,* 50.10 (2004): 2231-2242). An advantage of recent sparse coding algorithms is that they allow us to exploit the correlation between the columns of matrix Y (Duarte, M. F., et al. "Distributed compressed sensing of jointly sparse signals." *Asilomar Conf. Signals, Sys., Comput.* 2005). For example, consider the case of a device, whose program code is expected to contain loops, and therefore, some of the frequency measurements forming the matrix Y are expected to be highly correlated. Sparse-coding algorithms are able to leverage such correlation.

In some embodiments, sparse coding algorithms is leveraged to disaggregate the contributions to measured RF from individual instructions.

Hybrid State Tracking

Figure 10:
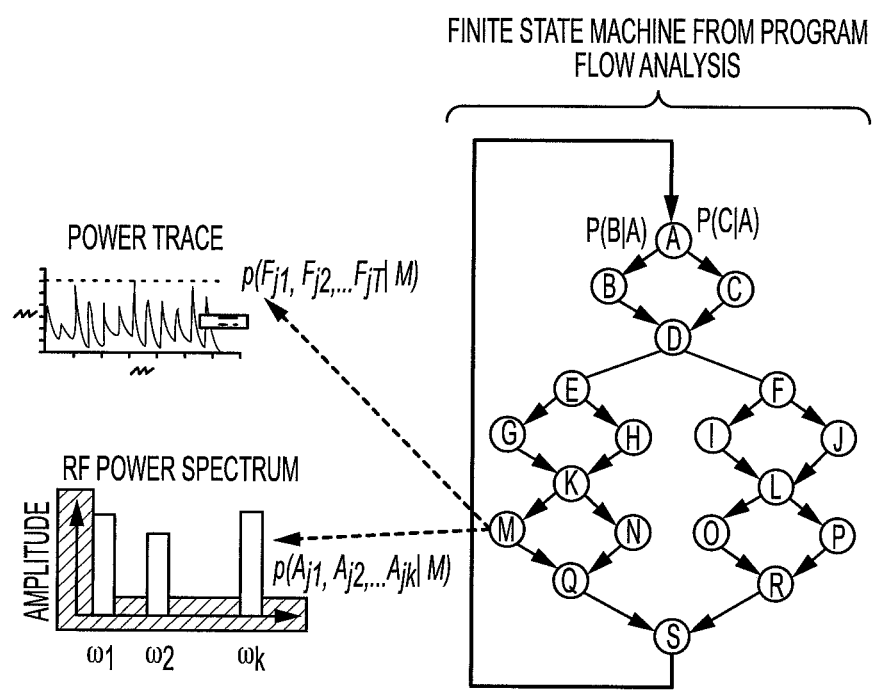
FIG. 10 shows a Hidden Markov Model for anomaly detection and control-flow tracking.

To track the device states, some embodiments use a hybrid approach, e.g., combining the analog emission models and finite state machine models described earlier within a machine learning framework. This hybrid approach uses Hidden Markov Models (HMM), which have been proven to be effective for tracking states of finite state machines. The output of an HMM inference is a mapping of time instants to nodes of the finite state machine (state transition model). In some embodiments, the finite state machine is derived from the program flow analysis (see FIG. 10, which shows a Hidden Markov Model for anomaly detection and control-flow tracking). The nodes of the graph represent code blocks or instructions depending on the model fidelity. The edges represent possible transitions to other nodes. If there is a high degree of knowledge about the device software/firmware, then it is expected for the graph to have fewer edges. On the other hand, if there is no knowledge about the device software/firmware, then the graph will have a larger number of edges representing that transition to a larger set of nodes is possible from any given node. Each edge is also associated with a transition probability. For example, P(C|A) denotes the probability to transition to node C from node A. An observation model exists for each sensing modality for each node that the software/firmware can be in. These observation models are the condition probability distributions described under the signal modeling section.

Machine leaning can be applied to the data from the RF signal, the power, and the temperature to help build the finite state machine model.

Figure 11A:
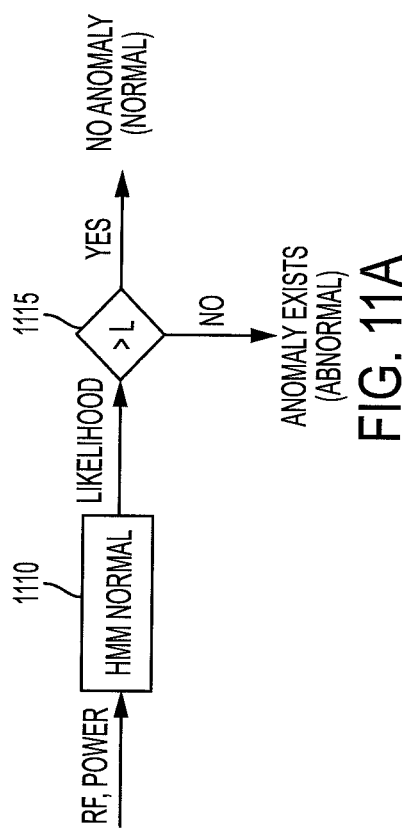
FIG. 11A shows anomaly detection using only normal HMM model.
Figure 11B:
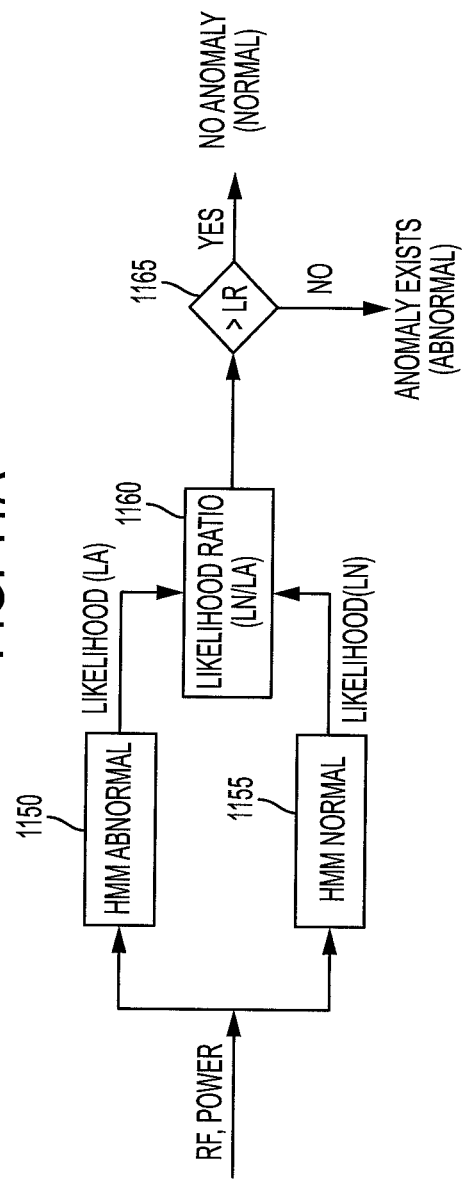
FIG. 11B shows identification when one or more abnormal HMM models are available.

In vanilla HMMs, the duration of time that can be spent at a given node is exponentially distributed. This may not always be a valid assumption. The approaches described herein propose to use Explicit Duration Modeled HMM (EDHMM), which offers a richer modeling framework that does not suffer from this drawback. Given an observation sequence, it is possible to infer the most probable sequence of the instructions that generated the observations (Rabiner, Lawrence R., and Biing-Hwang Juang. "An introduction to hidden Markov models." *ASSP Magazine, IEEE* 3.1 (1986):

4-16). This sequence can be used in an anomaly detection framework to distinguish known sequences from unknown sequences. The sequence also provides an identification of the attack being performed if a library of attack vectors and their corresponding instruction sequence is available. FIGS. 11A-11B provide a graphical description of the HMM based analysis framework when only a normal model is available, and when one or more abnormal models are available.

Specifically, FIG. 11A shows anomaly detection using only normal HMM model. In step 1110, the likelihood of the HMM being normal is computed. In step 1115, the likelihood computed in step 1110 is compared to a threshold L to determine if the system is in the normal or abnormal state (e.g. if an anomaly exists).

FIG. 11B shows identification when one or more abnormal HMM models are available. In step 1150, the likelihood of the HMM being abnormal, LA, is computed. In step 1155, the likelihood of the HMM being normal, LN, is computed. In step 1160, the ratio of LN to LA is computed. In step 1165, the ratio of LN to LA is compared to a threshold LR to determine if the system is in the normal or abnormal state (e.g. if an anomaly exists). In case of more than one abnormal model, the pairwise likelihood ratios can be computed and the decision based on the maximum pairwise ratio. In addition, when an anomaly is detected, the system may shut down the EMDS that has the anomaly.

When the monitored devices are all observing the same physical phenomenon, it is expected that their analog emissions will be correlated. Consider the case where all monitored devices are running the same program, either in a synchronized fashion or with a known time offset. This affords the opportunity for more reliable program analysis for two reasons. Firstly, the HMM-based analysis algorithm described earlier can now distinguish between nominal and anomalous operation using multiple dependent hypotheses about the set of instructions being sampled. Concretely, the set of instructions sampled by one device serves as side information while estimating the set of instructions sampled by another device in the same environment. Secondly, by staggering the t-length sampling windows, it is possible to increase the effective frequency with which groups of instructions are sampled. The increased sampling frequency results in greater continuity among the sampled instructions, which in turn, implies greater certainty about state transitions in the finite state machine.

The above development highlights an important research problem: What if there are different kinds of devices, and thus different programs being executed in the same environment? Since the instruction set of each device is different, program analysis in this situation is more challenging than the situation with similar devices. One way to address this challenge is to augment the HMM with high-level expertise about the correlation among the signals sensed by the devices—for instance, the relationship between the temperature sensed by a thermostat and the presence or absence of a gas leak sensed by a gas monitor.

Validation Testing

For validation testing purposes, analog emissions from the devices of interest will be characterized both in nominal and known attack modes. Some testing implementations include a test bed with sensors and test devices. Existing anechoic chambers and other laboratory facilities provide low electro-magnetic noise environments, while server rooms and building facilities with heavy electrical machinery provide high noise environments. An initial test setup may be a setup similar to FIG. 1A. For thin clients and laptops, a set-up similar to FIG. 2 may be used.

Risks and Mitigation

TABLE 3 examples of risks, impacts, and mitigations.

| Risk | Impact | Mitigation |
| --- | --- | --- |
| 1. Hardware and communication bandwidth constraints lead to sampling at rates much lower than instructions per second. | Observed analog emissions are a mix of emissions from a set of instructions. | Identify program cycles from observed data. Align the measurements from one cycle to another and utilize principles of super-resolution (Park, Sung Cheol, Min Kyu Park, and Moon Gi Kang. "Super-resolution image reconstruction: a technical overview." Signal Processing Magazine, IEEE 20.3 (2003): 21-36) to identify instruction boundaries. |
| 2. Large thermal time constants of device components may make it difficult to see the fast dynamics due to state switching with thermochromic sensing for offline modeling. | Power consumption model and memory access pattern models may not effectively capture tne dynamics. | Experiments with selectively pre-heating or pre-cooling certain device components may reveal some of the dynamics. |
| 3. To distinguish all device states, RF emissions over a large bandwidth have to be measured. | One small RF antenna may not work over the entire spectral range. | Local sensor design may need to accommodate multiple antennas for different spectral regions. Exploring trade-off between gain and efficiency can reduce the size of each antenna. |
| 4. Wireless communications packets can be sniffed. | Device vulnerability is increased. | The wireless channel can be encrypted. |
| 5. High computational complexity of the algorithms. | Central reader may be unable to keep up with the incoming data rate. | Performance can be traded off with computational complexity. For example, nodes of the finite state machine may be combined into meta-nodes to reduce the number of states leading to lower complexity. A subset of measurement features can be used. |

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. A system for detecting an anomaly in an Embedded Mission Specific Device (EMSD), comprising:
    a meta-material antenna configured to receive a radio frequency signal from the EMSD;
    a central reader configured to receive a signal from the meta-material antenna, the central reader further configured to:

build a finite state machine model of the EMSD based on the signal received from the meta-material antenna; and detect if an anomaly exists in the EMSD based on the built finite state machine model.

2. The system of claim 1, wherein the finite state machine model of the EMSD is built using machine learning to analyze the signal received from the meta-material antenna.

3. The system of claim 1, wherein the central reader is further configured to build the finite state machine model by:
forming a plurality of clusters of execution traces from a set of execution traces; and
computing a separate finite state automation (FSA) for each cluster within the plurality of clusters.

4. The system of claim 1, wherein:
the meta-material antenna length and width are both less than $\lambda/40$; and
$\lambda$ is a wavelength of operation of the meta-material antenna which is in the megahertz (MHz) range.

5. The system of claim 1, wherein the meta-material antenna comprises a sticker configured to be placed on the EMSD.

6. The system of claim 1, wherein the central reader is further configured identify a particular attack based on:
a library of attack vectors and their corresponding instruction sequences; and
the finite state machine model.

7. The system of claim 1, wherein the central reader is further configured to:
in response to detection of an anomaly in the EMSD, shut down the EMSD.

8. The system of claim 1, wherein the built finite state machine model is a normal model, and the central reader is further configured to detect if an anomaly exists in the EMSD based on a ratio between a likelihood of the normal model and a likelihood of an abnormal finite state machine model of the EMSD.

9. The system of claim 1, wherein the central reader is further configured to:
build the finite state machine model of the EMSD based on a temperature gradient of the EMSD.

10. The system of claim 9, wherein the finite state machine model of the EMSD is built using machine learning to analyze the temperature gradient.

11. The system of claim 1, wherein the central reader is further configured to:
build the finite state machine model of the EMSD based on a power trace of the EMSD.

12. The system of claim 11, wherein the finite state machine model of the EMSD is built using machine learning to analyze the power trace.

13. A method for detecting an anomaly in an Embedded Mission Specific Device (EMSD), comprising:
receiving, with a meta-material antenna, a radio frequency signal from the EMSD;
with a central reader:
receiving a signal from the meta-material antenna;
building a finite state machine model of the EMSD based on the signal received from the meta-material antenna; and
detecting that an anomaly exists in the EMSD based on the built finite state machine model.

14. The method of claim 13, wherein the finite state machine model of the EMSD is built using machine learning to analyze the signal received from the meta-material antenna.

15. The method of claim 13, further comprising building the finite state machine model of the EMSD based on a temperature gradient of the EMSD.

16. The method of claim 15, wherein the finite state machine model of the EMSD is built using machine learning to analyze the temperature gradient.

17. The method of claim 13, further comprising building the finite state machine model of the EMSD based on a power trace of the EMSD.

18. The method of claim 17, wherein the finite state machine model of the EMSD is built using machine learning to analyze the power trace.

19. A system for detecting an anomaly in an Embedded Mission Specific Device (EMSD), comprising:
a meta-material antenna configured to receive a radio frequency signal from the EMSD;
one or more processors configured to receive a signal from the meta-material antenna, the one or more processors further configured to:
build a finite state machine model of the EMSD based on the signal received from the meta-material antenna; and
detect if an anomaly exists in the EMSD based on the built finite state machine model.

20. The system of claim 19, wherein the one or more processors are comprised in a thin client, smart phone, or laptop.

* * * * *